United States Patent
Shah et al.

(10) Patent No.: US 12,243,005 B2
(45) Date of Patent: Mar. 4, 2025

(54) METHOD FOR TRACKING STOCK LEVEL WITHIN A STORE

(71) Applicant: Simbe Robotics, Inc, San Francisco, CA (US)

(72) Inventors: Mirza Akbar Shah, San Francisco, CA (US); Bradley Bogolea, San Francisco, CA (US); Jeffrey Gee, San Francisco, CA (US)

(73) Assignee: Simbe Robotics, Inc, South San Francisco, CA (US)

( * ) Notice: Subject to any disclaimer, the term of this patent is extended or adjusted under 35 U.S.C. 154(b) by 0 days.

(21) Appl. No.: 17/592,462

(22) Filed: Feb. 3, 2022

(65) Prior Publication Data
US 2022/0156687 A1   May 19, 2022

Related U.S. Application Data

(63) Continuation of application No. 16/792,101, filed on Feb. 14, 2020, now Pat. No. 11,276,034, which is a continuation of application No. 15/347,689, filed on Nov. 9, 2016, now Pat. No. 10,607,182.

(60) Provisional application No. 62/339,039, filed on May 19, 2016, provisional application No. 62/253,023, filed on Nov. 9, 2015.

(51) Int. Cl.
| | | |
|---|---|---|
| *G06Q 10/08* | (2023.01) | |
| *G05D 1/00* | (2006.01) | |
| *G05D 1/02* | (2020.01) | |
| *G06Q 10/087* | (2023.01) | |
| G06V 20/10 | (2022.01) | |
| *G06V 20/52* | (2022.01) | |

(52) U.S. Cl.
CPC ......... *G06Q 10/087* (2013.01); *G05D 1/0212* (2013.01); *G05D 1/0274* (2013.01); *G06V 20/10* (2022.01); *G06V 20/52* (2022.01); G05D 2201/0207 (2013.01)

(58) Field of Classification Search
CPC .. G06Q 10/087; G05D 1/0212; G05D 1/0274; G05D 2201/0207; G06V 20/10; G06V 20/52
See application file for complete search history.

(56) References Cited

U.S. PATENT DOCUMENTS

| | | |
|---|---|---|
| 2017/0286773 A1 | 10/2017 | Skaff et al. |
| 2017/0309136 A1 | 10/2017 | Schoner |
| 2017/0323376 A1 | 11/2017 | Glaser et al. |

OTHER PUBLICATIONS

Office Action received in U.S. Appl. No. 17/113,877 dated Mar. 10, 2022.

*Primary Examiner* — Michael Jared Walker
(74) *Attorney, Agent, or Firm* — Run8 Patent Group, LLC; Peter Miller

(57) ABSTRACT

One variation of a method for tracking stock level within a store includes: dispatching a robotic system to image shelving structures within the store during a scan cycle; receiving images from the robotic system, each image recorded by the robotic system during the scan cycle and corresponding to one waypoint within the store; identifying, in the images, empty slots within the shelving structures; identifying a product assigned to each empty slot based on product location assignments defined in a planogram of the store; for a first product of a first product value and assigned to a first empty slot, generating a first prompt to restock the first empty slot with a unit of the first product during the scan cycle; and, upon completion of the scan cycle, generating a global restocking list specifying restocking of a set of empty slots associated with product values less than the first product value.

12 Claims, 4 Drawing Sheets

METHOD FOR TRACKING STOCK LEVEL WITHIN A STORE

CROSS-REFERENCE TO RELATED APPLICATIONS

This Application is a continuation application of U.S. patent application Ser. No. 16/792,101, filed on 14 Feb. 2020, which is a continuation application of U.S. patent application Ser. No. 15/347,689, filed on 9 Nov. 2016, which claims the benefit of U.S. Provisional Application No. 62/253,023, filed on 9 Nov. 2015, and U.S. Provisional Application No. 62/339,039, filed on 19 May 2016, each of which is incorporated in its entirety by this reference.

TECHNICAL FIELD

This invention relates generally to the field of stock keeping and more specifically to a new and useful method for tracking stock level within a store in the field of stock keeping.

BRIEF DESCRIPTION OF THE FIGS.

Figure 1:
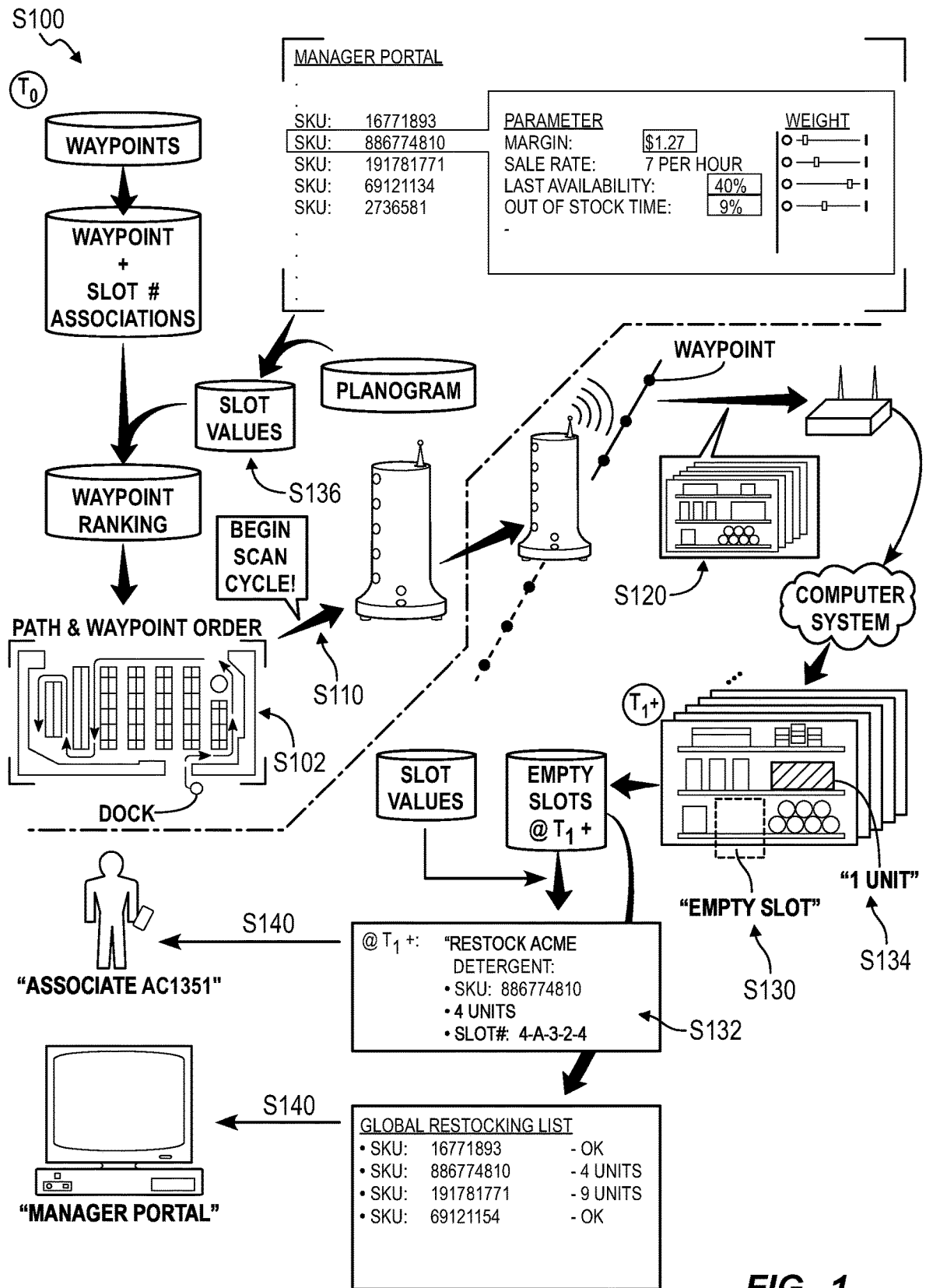
Figure 2:
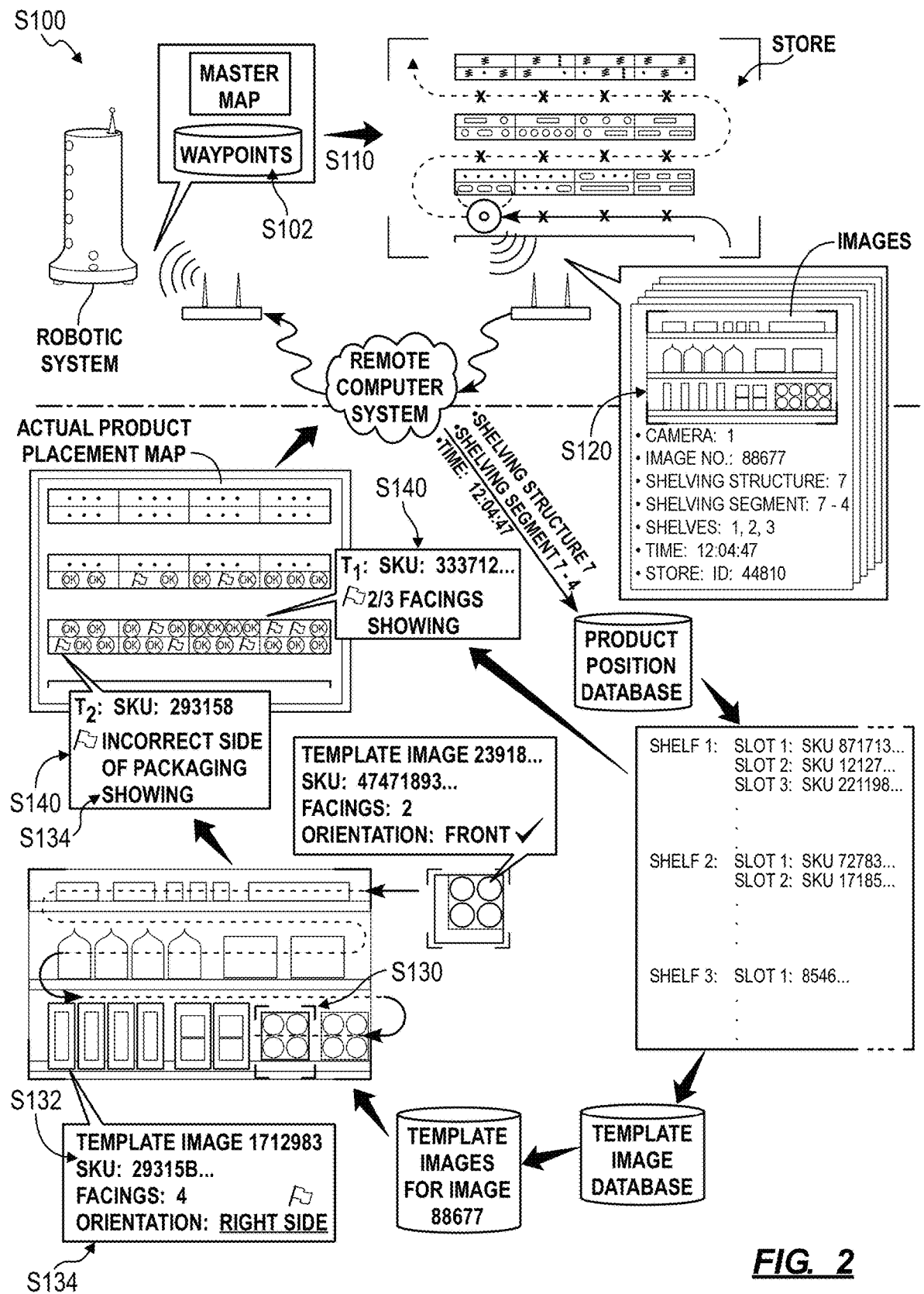
Figure 3:
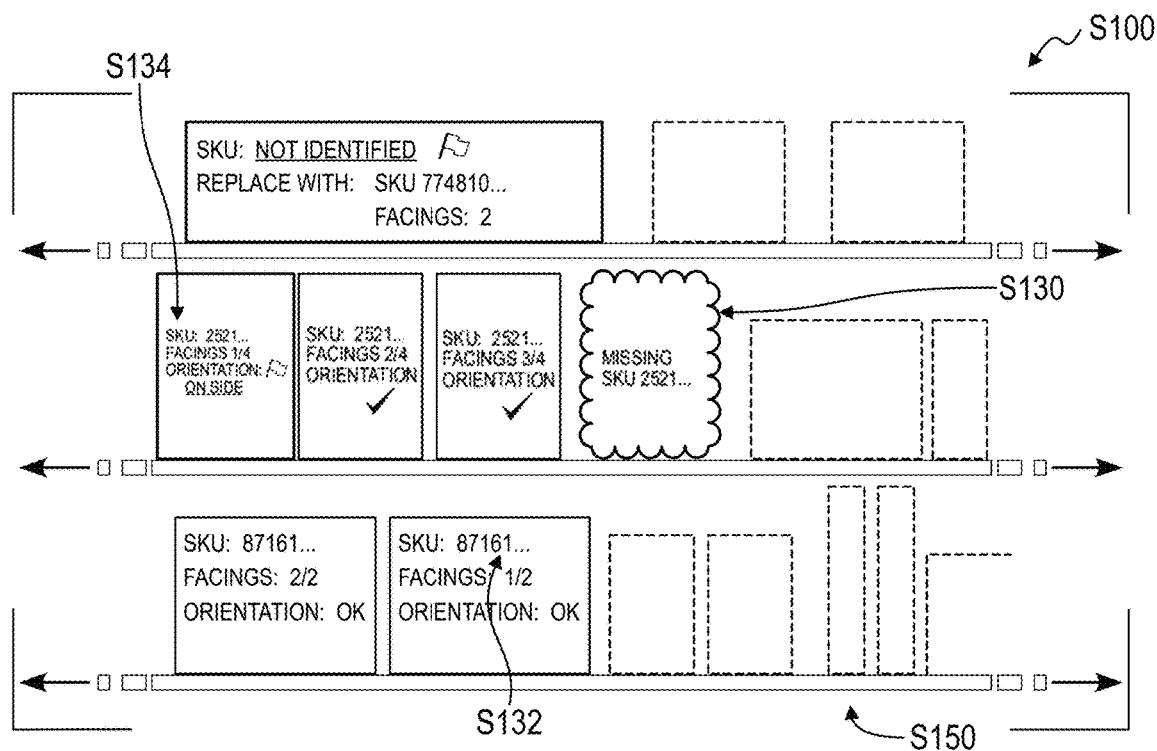
Figure 4:
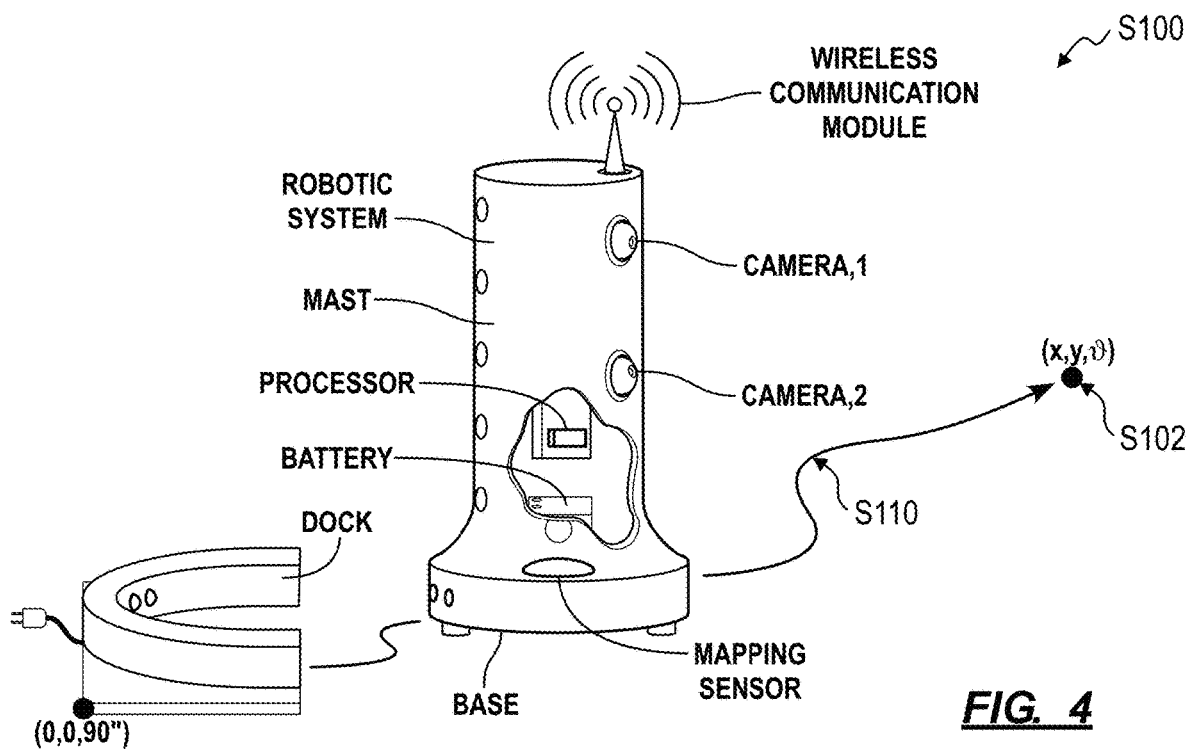
Figure 5:
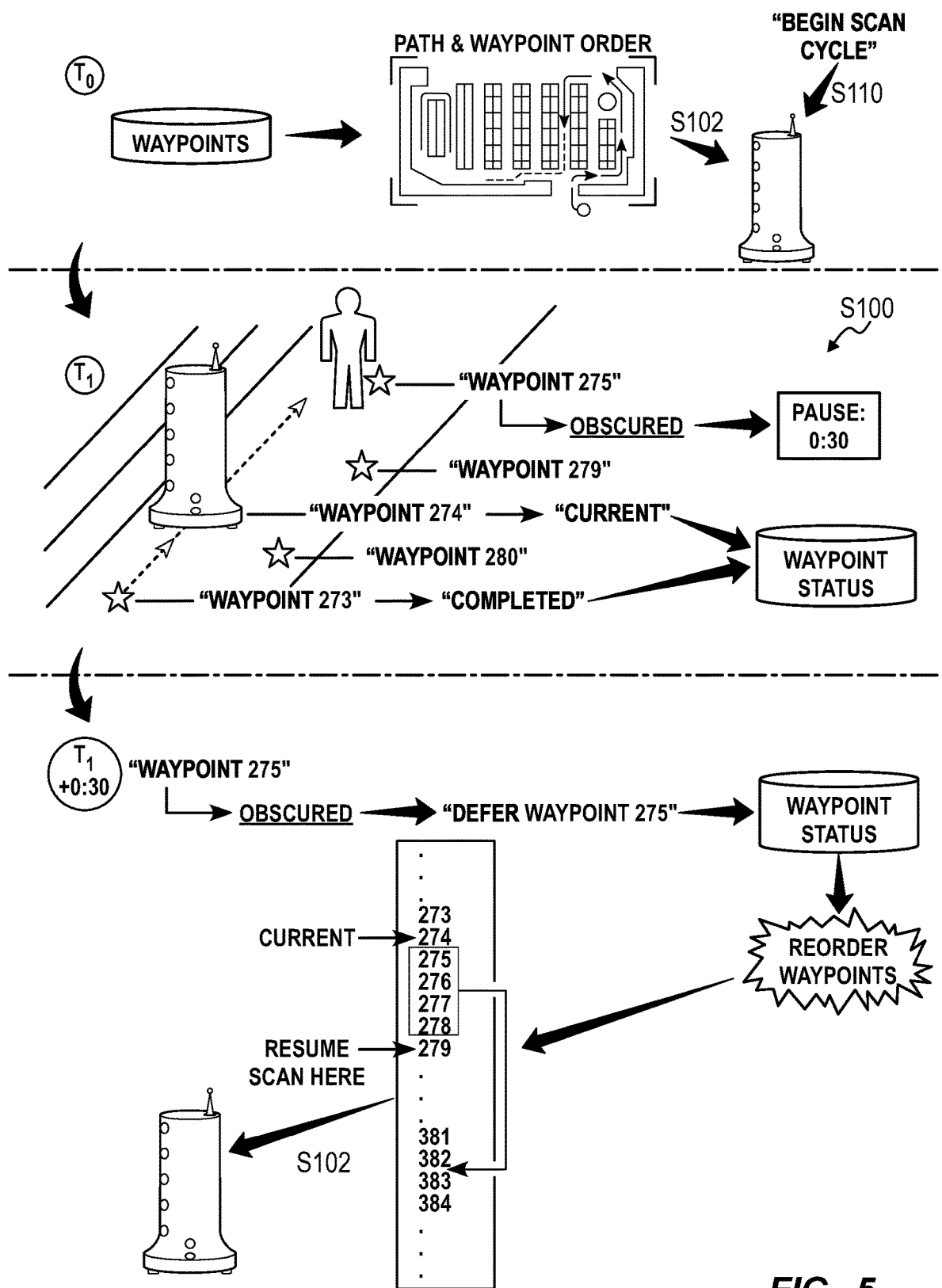

FIG. 1 is a flowchart representation of a method;
FIG. 2 is a flowchart representation of one variation of the method.
FIG. 3 is a graphical representation of one variation of the method;
FIG. 4 is a flowchart representation of one variation of the method; and
FIG. 5 is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIG. 1, a method for tracking stock level within a store includes: dispatching a robotic system to image a set of shelving structures within the store during a scan cycle concurrent with a peak traffic period in the store in Block S110; receiving a set of images from the robotic system in Block S120, each image in the set of images recorded by the robotic system during the scan cycle and corresponding to one waypoint in a set of waypoints defined along the set of shelving structures; identifying, in the set of images, a set of empty slots within the set of shelving structures in Block S130; identifying a product assigned to each empty slot in the set of empty slots based on product location assignments defined in a planogram of the store in Block S132; for a first product associated with a first product value and assigned to a first empty slot in the set of empty slots, generating a first prompt to restock the first empty slot with a unit of the first product during the scan cycle in Block S140; and in response to completion of the scan cycle, generating a global restocking list specifying restocking of a second subset of empty slots in the set of empty slots in Block S150, each empty slot in the second subset of empty slots assigned a product associated with a product value less than the first product value.

One variation of the method S100 includes: dispatching a robotic system to image a set of shelving structures within the retail space during a scan cycle concurrent with open store hours in the retail space in Block S110; receiving a set of images from the robotic system in Block S120, each image in the set of images recorded by the robotic system during the scan cycle and corresponding to one waypoint in a set of waypoints defined along the set of shelving structures; identifying, in the set of images, a set of slots within the set of shelving structures in Block S130; for each slot in the set of slots, determining a number of units of a product—assigned to the slot in a planogram of the retail space—currently in the slot in Block S134 and calculating a slot value of the slot as a function of product value of the product assigned to the slot and as an inverse function of the number of units of the product currently in the slot in Block S136; for a first slot in the set of slots associated with a first slot value, generating a first prompt to restock the first slot with a unit of a first product during the scan cycle in Block S140; and in response to completion of the scan cycle, generating a global restocking list specifying restocking of a second subset of slots in the set of slots in Block S150, each slot in the second subset of slots associated with a slot value less than the first slot value.

Another variation of the method S100 includes: dispatching a robotic system to image a set of shelving structures within the store during a scan cycle in Block S110; receiving a set of images from the robotic system in Block S120, each image in the set of images recorded by the robotic system during the scan cycle and corresponding to one waypoint in a set of waypoints defined along the set of shelving structures; identifying, in the set of images, a set of empty slots within the set of shelving structures in Block S130; for each empty slot in the set of empty slots, identifying a product assigned to the empty slot based on product location assignments defined in a planogram of the store in Block S132 and calculating a slot value of the empty slot as a function of a product value of the product assigned to the slot in Block S136; and generating a global restocking list comprising a set of prompts specifying restocking of the set of empty slots and ordering the set of prompts in the global restocking list according to slot values of empty slots in the set of empty slots in Block S150.

2. Applications

Generally, Blocks of the method S100 can be executed by a computer system: to dispatch a robotic system to capture images of products arranged on shelves throughout a retail space (e.g., a grocery store); to determine stocking status of products assigned to slots on shelves throughout the retail space based on images received from the robotic system and a planogram defining product locations throughout the retail space; and to automatically prompt an associate of the retail space to reload empty slots throughout the retail space. In particular, the computer system can execute Blocks of the method S100 to automatically: collect images of shelves within a store; determine the presence and arrangement of units of products on these shelves from these images; identify deviations between actual product arrangement throughout the store and target product presentation requirements defined in a planogram of the store; and to package such deviations for consumption and handling by associates (e.g., employees) of the store. The computer system can therefore: dispatch a robotic system to collect images of shelves within a store in Block S110; receive images from the robotic system in real-time en bloc in Block S120; process these images to determine the presences, positions, and/or orientations of products on shelves in the store and to identify deviations from store planograms based on these product presences, positions, and/or orientations in Blocks S130, S132, and S134; and automatically prompt employees or associates of the store to correct these deviations in Blocks S140 and S150.

Furthermore, in Blocks S140 and S150, the computer system can prioritize distribution of restocking prompts to associates of the store based on product values of products assigned to empty slots or based on slot values of empty slots. In particular, during execution of a scan cycle, the robotic system can upload images to the computer system substantially in real-time, and the computer system can process these images substantially in real-time to generate a restocking prompt for each slot throughout the store determined to be empty, determined to contain a unit of an incorrect (unassigned) product, or determined to contain a misoriented unit of an assigned product. In Block S150, the computer system can then calculate a product value for products assigned to each slot and then: serve restocking prompts for slots assigned to products of product values exceeding a threshold product value; or reorder restocking prompts in real-time based on product values of corresponding products as empty, low-stock, or incorrectly-stocked slots are identified in images received from the robotic system during the scan cycle. Alternatively, in Block S150, the computer system can then calculate a slot value for each slot and then: serve restocking prompts associated with slot values exceeding a threshold slot value; or reorder restocking prompts for slots in real-time based on corresponding slot values calculated based on slot states identified from images received from the robotic system during the scan cycle. Associates of the store can thus respond to these restocking prompts—for higher-value products and/or higher-value slots—substantially in real-time during the scan cycle in order to ensure that these higher-value products and/or higher-value slots are correctly stocked for customers of the store, such as during high-traffic periods in the store (e.g., 5-7:30 PM on weekdays and noon-7:00 PM on weekends in a grocery store). The computer system can then aggregate restocking prompts for slots assigned to products with lower product values or associated with lower slot values into a global restocking list that associates of the store can respond to asynchronously, such as upon conclusion of high-traffic periods in the store or once the store has closed for the current day (e.g., after 10:00 PM).

Therefore, the computer system can: interface with a robotic system to collect images of shelves throughout a store; transform these images into current stock states of slots on shelves throughout the store substantially in real-time as images are received from the robotic system; generate restocking prompts for select slots assigned to highest-value products or associated with greatest slot values and serve these restocking prompts to a computing device assigned to an associate of the store substantially in real-time; and generate restocking prompts for other slots assigned to lower-value products or associated with lower slot values, compile these restocking prompts into a global restocking list, and serve this global restocking list to a computing device assigned to an associate of the store asynchronously, such as just prior to a scheduled restocking period at the store.

In particular, sales data collected through a point-of-sale (or "POS") system in the store may not account for theft of product, damaged product, lost product, misplaced product on shelves, improper product facing orientation on shelves, or origin of unit of product sold. (For example, a carbonated beverage may be stocked in 25 unique locations within a store, but sale of a unit of carbonated beverage at the POS may not indicate from which of these 25 unique locations the unit of carbonated beverage originated.) However, by dispatching the robotic system to collect images of shelves throughout the store, the computer system can: access real-time, on-floor inventory in the store; detect "holes," misplaced product, and low-stock slots throughout the store; and then serve directed prompts to restock high-value slots in real-time and serve directed prompts to restock all slots during scheduled restocking periods. The computer system can therefore implement the method S100 to: eliminate a need for associates to take manual inventory; maximize a value (e.g., relative margin) of dispatching an associate to restock select slots during high-traffic periods in the store; and automatically generate a global restocking list for associates of the store in preparation for a scheduled restocking period. Furthermore, by issuing real-time prompts to restock slots of high-value throughout the store, the computer system can enable the store to recuperate lost sales due to empty or incorrectly-stocked slots, thereby increasing sales volume of products of greatest value (e.g., margin or total profit) to the store.

3. Robotic System

During a scan cycle, a robotic system navigates to waypoints—handled by the computer system according to Blocks of the method S100 described below—and captures images of shelves in the store at these waypoints. Generally, the robotic system can define a network-enabled mobile robot that can autonomously traverse a store, capture images of shelves within the store, and upload those images to a remote computer system for analysis.

In one implementation, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft LIDAR scanning systems); a processor that transforms data collected by the mapping sensors into two- or three-dimensional maps of a space around the robotic system; a mast extending vertically from the base; a set of cameras arranged on the mast; a geospatial position sensor (e.g., a GPS sensor); and a wireless communication module that downloads waypoints and a master map of a store from a remote computer system (e.g., a remote server) and that uploads digital photographic images (hereinafter "images") captured by the camera and maps generated by the processor to the remote computer system, as shown in FIG. 4. In this implementation, the robotic system can include cameras mounted statically to the mast, such as two vertically offset cameras on a left side of the mast and two vertically offset cameras on the right side of the mast, as shown in FIG. 4. The robotic system can additionally or alternatively include articulable cameras, such as: one camera on the left side of the mast and supported by a first vertical scanning actuator; and one camera on the right side of the mast and supported by a second vertical scanning actuator. The robotic system can also include a zoom lens, a wide-angle lens, or any other type of lens on each camera. However, the robotic system can define any other form and can include any other subsystems or elements supporting autonomous navigating and image capture throughout a store environment.

4. Hierarchy and Terms

A "product facing" is referred to herein as a side of a product (e.g., of a particular SKU or other product identifier) designated for a slot. A "planogram" is referred to herein as a graphical representation of multiple product facings across a shelving structure. A "realogram" is referred to herein as a collection of multiple planograms representing multiple shelving structures within a store (e.g., across an entire store). Product identification, placement, and orientation data recorded visually in a realogram (or in one or more planograms) can be also recorded in a corresponding textual product placement spreadsheet, slot index, or other store database (hereinafter "product placement database").

A "slot" is referred to herein as a section of a shelf designated for occupation by one product facing, including a row of one or more units of a product. A "shelf" is reference herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures. A "store" is referred to herein as a (static or mobile) facility containing one or more shelving structures and one or more aisles.

A "product" is referred to herein as a type of packaged good associated with a particular product identifier (e.g., a SKU). A "unit" or "product unit" is referred to herein as an instance of a product, such as one packaged article in a series of packaged articles associated with one SKU value. An "address" is referred to herein as a pointer to corresponding aisle, shelving structure, shelving segment, shelf, slot and/or other data stored in a planogram, product position database, or other database for the store.

The method S100 is described herein as executed by a remote computer system (e.g., a remote server, hereinafter a "computer system"). However, Blocks of the method S100 can be executed by one or more robotic systems placed in a retail space (or store, warehouse, etc.), by a local computer system, or by any other computer system.

5. Scan Cycle Path Planning

As shown in FIGS. 1 and 5, one variation of the method S100 includes Block S102, which recites: defining an order for the set of waypoints based on product values of products assigned to slots, within the set of shelving structures, in fields of view of cameras integrated into the robotic system when occupying each waypoint in the set of waypoints; and serving the order for the set of waypoints to the robotic system for execution during the scan cycle. Generally, in Block S102, the computer system can set an order

5.1 Waypoints

The computer system can implement a set of waypoints defining locations within a store at which the robotic system is to navigate and capture one or more images during a scan cycle, and the computer system can link a waypoint (or content in the waypoint) to an image captured by the robotic system while at or near the waypoint. Based on the location specified in the waypoint, the computer system can retrieve a list of stock keeping units (SKUs) or other identifiers of products designated for stocking on shelves near the waypoint, such as all SKUs designated for a shelving structure, all SKUs in a shelving segment, all SKUs on a set of shelves, or a SKU for a particular slot, etc. in the field of view of the camera when the image was captured. Based on the SKUs, the computer system can filter a relatively large database (e.g., millions) of template images down to a relatively small set of (e.g., fifteen) template images particularly relevant to the image. By implementing computer vision techniques to compare this relatively small set of template images to subregions in the image, the computer system can determine the presence, orientation, and/or position of various products on shelves in the store relatively quickly and with a relatively high degree of accuracy.

For example, the robotic system can be placed within a retail store (or warehouse, etc.), and the computer system (e.g., a remote server connected to the robotic system via the Internet) can dispatch the robotic system to collect images at waypoints throughout the retail store outside of store hours, such as every night beginning at 1 AM. The robotic system can thus complete a scan cycle before the retail store opens a few hours later. Furthermore, the computer system can process images collected during the scan cycle to generate a graph, map, or table of current product placement on shelves in the store and/or to generate a task list of misplaced or misoriented products to correct, and the computer system can present this graph, map, table, and/or task list to employees upon their arrival at the retail store the next morning before the retail store opens. Alternatively, the computer system can dispatch the robotic system to waypoints within the store during store hours and can process images received from the robotic system substantially in real-time to generate current such graphs, maps, tables, and/or task lists in near-real-time.

In Block S102, the computer system can therefore maintain, update, and distribute a set of waypoints to the robotic system, wherein each waypoint defines a location within a store at which the robotic system is to capture one or more images. In one implementation, the computer system defines an origin of a two-dimensional Cartesian coordinate system for the store at a charging station (or "dock," as shown in FIG. 4)—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) an (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system, as shown in FIG. 4. When executing a waypoint, the robotic system can orient to (e.g., within 1.5° of) the target orientation defined in the waypoint in order to align a camera to an adjacent shelving structure.

When navigating to a waypoint, the robotic system can scan an environment nearby with the mapping sensor (e.g., a LIDAR sensor, as described above), compile scans into a new map of the robotic system's environment, determine its location within the store by comparing the new map to a master map of the store defining the coordinate system of the store, and navigate to a position and orientation within the store at which the output of the mapping sensor aligns—within a threshold distance and angle—with a region of the master map corresponding to the (x,y,∂) location and target orientation defined in the waypoint. A waypoint can also include a geospatial position (e.g., a GPS location), such as in the form of a backup or redundant location. For example, when navigating to a waypoint, the robotic system can approach the geospatial position defined in the waypoint;

once within a threshold distance (e.g., five feet) from the geospatial position, the computer system can navigate to a position and orientation at which the output of the mapping sensor aligns—within a threshold distance and angle—with a region of the master map corresponding to the (x,y,∂) location and target orientation defined in the waypoint.

Furthermore, a waypoint can include an address of each camera that is to capture an image once the robotic system can navigate to the waypoint. For example, for the robotic system that includes an upper-left camera, a lower-left camera, an upper-right camera, and a lower-right camera, the waypoint can include all or a subset of camera addresses [1, 2, 3, 4] corresponding to an upper-left camera, a lower-left camera, an upper-right camera, and a lower-right camera, respectively. In this example: a first waypoint designating a location centered between two facing full-height shelving segments can address all four cameras in the robotic system (e.g., camera addresses [1, 2, 3, 4]); a second waypoint designating a location centered between two facing half-height shelving segments can address the lower-left and lower-right cameras in the robotic system (e.g., camera addresses [2, 4]); and a third waypoint designating a location adjacent a single full-height shelving segment and a target orientation of 90° can address the upper-right and lower-right cameras in the robotic system (e.g., camera addresses [3, 4]). Alternatively, for the robotic system that includes articulable cameras, a waypoint can define an address and arcuate position of each camera that is to capture an image at the waypoint.

A waypoint can also specify (or be linked to) addresses of a category, an aisle, a shelving structure, a shelving segment, one or more shelves, and/or one or more slots expected to be in the field of view of a particular camera designated to capture an image at the waypoint. For example, a waypoint can designate all four cameras in the robotic system to capture images at the location specified in the waypoint, and the waypoint can designate: a [laundry section, aisle 2, shelving structure 1, shelving segment 2, shelves 1-4] address for a first image capture by the lower-left camera; a [laundry section, aisle 2, shelving structure 1, shelving segment 2, shelves 5-8] address for a second image capture by the upper-left camera; a [laundry section, aisle 2, shelving structure 2, shelving segment 2, shelves 1-4] address for a third image capture by the lower-right camera; and a [laundry section, aisle 2, shelving structure 2, shelving segment 2, shelves 5-8] address for a fourth image capture by the lower-left camera.

5.2 Individual Waypoint Ranking

In this variation, the computer system can calculate a value of each waypoint in the store, rank these waypoints by value, and set an order for navigating through these waypoints accordingly, as shown in FIG. 1.

In one implementation, the computer system accesses a planogram and a map of the store (e.g., a map geo-referenced to the planogram) to calculate a total product value (described below) of products in the field of view of cameras integrated into the robotic system at each waypoint in the set of waypoints. For example, for a particular waypoint, the computer system can: identify the location of the particular waypoint within the planogram; project known fields of view of cameras integrated into the robotic system onto the planogram—based on an orientation of the robotic system specified in the waypoint and based on a distance from the waypoint to an adjacent shelving structure defined in the map of the store—to identify a set of slots (e.g., a set of slot addresses) on the shelving structure that may be captured in a set of images recorded by the robotic system occupying the waypoint; pass this set of slot addresses into the planogram to retrieve a set of SKUs assigned to these slots; and then associate this waypoint with one or more unique SKUs and a number of facings of each SKU in the field of view of the robotic system when occupying the particular waypoint in real space in an orientation defined by the waypoint. In this example, the computer system can repeat this process for each waypoint defined throughout the store in order to associate each waypoint with a unique set of SKUs and SKU facings. The computer system can store and implement these SKUs and SKU facings over a series of scan cycles; the computer system can also repeat this process each time the planogram is revised or each time a new planogram is activated for the store.

The computer system can then rank the set of waypoints by product values of SKUs associated with each waypoint. For example, for each SKU assigned to a slot in the current planogram, the computer system can calculate a "product value" (or "priority," or "weight") as a function of profitability (or "margin") associated with the SKU and the number of units of the SKU sold at the store per unit of time (e.g., per day). In this example, the computer system can calculate a product value of a particular SKU as a product of the margin and a sale rate of the SKU, that is:

[product value]=[margin]·[#units sold per day].

The computer system can then rank waypoints by greatest product value of a single SKU assigned to a slot in the field of view of the robotic system when occupying each waypoint. Alternatively, for each waypoint, the computer system can calculate an "aggregate product value" for a particular waypoint by summing product values of SKUs assigned to all discernible slots in the field of view of the robotic system when occupying the particular waypoint; the computer system can then rank waypoints by greatest aggregate product value.

In another implementation, the computer system can rank waypoints based on near real-time POS sales data. In this implementation, in preparation for (e.g., immediately before) dispatching the robotic system to execute a scan cycle in Block S110, the computer system can access sales data from a POS system installed in the store to identify a quantity of each SKU sold at the store over a preceding period of time, such as: within a five-minute, thirty-minute, one-hour, or eight-hour period leading up to the current time; since a last restocking period at the store; or since a last scan cycle completed by the robotic system. The computer system can then calculate a current product value for each SKU in the store based on a margin assigned to each SKU (e.g., written to remote memory by a regional manager through an administrator portal hosted by the computer system) and a real-time frequency of sales of the SKU, such as:

[product value]=[margin]·[#units sold since last scan cycle].

For each waypoint defined throughout the store, the computer system can thus recalculate an aggregate product value for a particular waypoint based on new product values representing recent sale frequencies of SKUs falling within the field of view of the robotic system when occupying the particular waypoint. The computer system can then rank or prioritize each waypoint accordingly.

In a similar implementation, the computer system can prioritize waypoints based on historical sales frequencies. For example, in preparation for dispatching the robotic system to execute a scan cycle in Block S110, the computer system can retrieve historical sale data for SKUs specified in a current planogram of the store, such as: sale data for a last day, week, month, quarter, or year; for a current day of the week, sale data from this same day of the week for the previous five weeks; for a current or upcoming holiday, sale data from the last instance of the same holiday or holiday season; for a rainy spring day, sale data from the last two instances of rainy spring days; etc. In this example, the computer system can: retrieve these sale data from a POS implemented by the store; or implement methods and techniques described below to extract these sale data from changes in numbers of product facings identified across images collected during past scan cycles. For each SKU, the computer system can then multiply a stored margin of a particular SKU by the historical number or frequency of sales of the particular SKU to calculate a new product value for the SKU; for each waypoint, the computer system can calculate a new aggregate product value, as described above. The computer system can then automatically re-rank waypoints throughout the store accordingly by aggregate product value.

5.3 Waypoint Ordering by Individual Waypoint

The computer system can then define an order in which the robotic system is to navigate through the set of waypoints during the upcoming scan cycle based on waypoint rankings.

In one implementation, the computer system orders the set of waypoints such that, when executed by the robotic system, the robotic system: navigates from a home location at a dock to a first waypoint associated with a greatest aggregate product value in the set; executes an imaging routine to capture a set of images at each other waypoint between the home location and the first waypoint; marks each of these other waypoints as completed; upon reaching the first waypoint, executes an imaging routine to capture a set of images at the first waypoint; and then marks the first waypoint as completed. In this implementation, the computer system orders the remaining set of waypoints such that, after collecting images at the first waypoint, the robotic system: navigates toward a second waypoint—associated with a greatest aggregate product value for the remaining set of waypoints—via a path that minimizes overlap with waypoints already completed; executes an imaging routine to capture a set of images at each other waypoint between first waypoint and the second waypoint; marks each of these other waypoints as completed; upon reaching the second waypoint, executes an imaging routine to capture a set of images at the second waypoint; and marks the second waypoint as completed; etc. until a set of images has been recorded at all waypoints defined for the store or until the scan cycle is terminated, as described below.

In another implementation, the computer system calculates an order for navigating through the set of waypoints that maximizes total product value of products imaged by the robotic system per distance traversed by the robotic system during a scan cycle.

In another implementation, the computer system: calculates a sum of product values of products assigned to slots within a field of view of the robotic system occupying a waypoint for each waypoint in the store; identifies a first subset of waypoints associated with sums of product values greater than a threshold product value; identifies a second subset of waypoints associated with sums of product values less than the threshold product value; and defines an order for the set of waypoints that specifies navigation to (and image capture at) each waypoint in the first subset of waypoints, followed by navigation to each waypoint in the second subset of waypoints, followed by navigation to each waypoint in the first subset of waypoints during the scan cycle. In this implementation, the computer system can separately order the first and second subsets of waypoints to achieve a shortest total distance traversed over the course of the scan cycle in light of the robotic system's start location within the store. Alternatively, the computer system can: calculate an order for the complete set of waypoints that minimizes overlap along the robotic system's trajectory; order the first subset of waypoints by aggregate product value at each waypoint, to maximize the product value of product images per unit time or per unit distance traversed by the robotic system, or to minimize overlap in the robotic system's trajectory, etc.; and then append the waypoint order for the complete set of waypoints with the ordered first subset of waypoints. For example, for a store defining an approximately rectangular floor plan with parallel rows of shelving structures, the computer system can: define a serpentine path up and down each aisle in sequence from a near end of the store to a far end of the store followed by (or preceded by) a loop around the perimeter of the store to capture images at all waypoints with minimum path overlap; calculate an order for the first subset of waypoints—associated with aggregate product values exceeding a threshold value—that minimizes a path traversed by the robotic system on its way back to its dock; and append the serpentine path with the ordered first subset of waypoints.

In Block S102, the computer system can thus select a subset of waypoints associated with aggregate product values exceeding a threshold value (or select a preset number of waypoints associated with the greatest product values in the set of waypoints) and define a trajectory for the robotic system that directs the robotic system to this subset of waypoints (at least) twice and to all other waypoints in the store (at least) once during a scan cycle.

5.4 Waypoint Order by Shelving Structure Priority

Alternatively, in this variation, the computer system can group waypoints and implement methods and techniques described above to set an order for navigating between groups of waypoints within the store during a scan cycle.

In one implementation, the computer system groups waypoints by row defined along the length of each shelving structure within the store. The computer system then: sums product values of products assigned to slots in a shelf segment for each shelving structure in the store (i.e., for each group of waypoints); prioritizes the set of shelving structures in order of product value sum; orders the groups of waypoints accordingly; and calculates a trajectory through the ordered groups of waypoints that minimizes the total distance traversed by the robotic system from waypoints defined along a first shelving structure associated with a greatest product value sum to waypoints defined along a last shelving structure associated with a lowest product value sum. Thus, when the robotic system is dispatched to execute a scan cycle in Block S110, the robotic system can: navigate to the first shelving structure and capture images at each waypoint in the first group of waypoints; then navigate to the second shelving structure and capture images at each waypoint in the second set of waypoints, even if the second shelving structure is substantially removed from the first shelving structure; etc. for each shelving structure in the store. In a similar implementation, the computer system can rank each shelving structure (e.g., each group of waypoints) by the greatest product value of a single SKU assigned to each shelving structure and order the groups of waypoints accordingly.

In another implementation, the computer system can calculate an order for navigating through groups of waypoints that maximizes the total product value of products imaged per unit time throughout a scan cycle. In one example: the sum of all product values of products assigned to slots along shelving structure 2 within the store is the greatest at 4389; the sum of all product values of products assigned to slots along shelving structure 1—facing shelving structure 2—is 1238; the sum of all product values of products assigned to shelving structure 18—near an opposite end of the store—is second greatest at 4285; the sum of all product values of products assigned to shelving structure 9—near an opposite end of the store—is 2831; and the robotic system is stationed nearest shelving structure 18. In this example, the computer system can set an order for navigating through waypoints in the store such that the robotic system first images shelving structure 18, . . . followed by shelving structure 9, . . . followed by shelving structure 2, and finally shelving structure 1, thereby maximizing the product value of products imaged by the robotic system per unit time throughout the scan cycle.

In the foregoing implementations, the computer system can implement methods and techniques described above to (re)calculate product values for SKUs arranged throughout the store. The computer system can also: identify select shelving structures containing singular high-value products (e.g., products associated with static or dynamic product values exceeding a threshold product value) or associated with total product values exceeding a threshold total product value; and define a trajectory for the robotic system that directs the robotic system along these select shelving structures (at least) twice and along all other shelving structures (at least) once during a scan cycle.

5.5 Waypoint Order by Scheduled Restocking Periods

In another implementation, the computer system orders waypoints based on scheduled restocking periods. For example, the computer system can: access a restocking schedule for each section (or "category") of the store (e.g., a spice section, a canned foods section, a laundry section, a carbonated beverage section, and a dairy section, etc.); identify a particular section of the store assigned an upcoming restocking period; retrieve a group of waypoints within this particular section; and generate a waypoint order that places the group of waypoints ahead of all other waypoints in the store for a next scan period. In this example, the computer system can also implement methods and techniques described above to order the group of waypoints corresponding to the particular section of the store and the remaining set of waypoints in the store, such as by ordering the group of waypoints and the remaining set of waypoints to minimize a total distance traversed by the robotic system over the scan cycle.

Alternatively, in preparation for a scheduled restocking period for the particular section of the store, the computer system can append an ordered list of waypoints—generated as described above—with a group of waypoints corresponding to the particular section of the store. During the scan cycle, the computer system can generate and serve real-time prompts to restock high-value slots in Block S140, as described below, based on image data collected during the scan cycle. Upon conclusion of the scan cycle, the computer system can generate a restocking list specific to the particular section of the store in Block S150 based on images recorded at the end of the scan cycle such that the section-specific restocking list is most current upon commencement of the restocking period for the particular section of the store.

The computer system can implement similar methods and techniques in response to receipt of manual confirmation of a restocking period for a particular section of the store, such as received through a manager portal, as described below.

5.6 Waypoint Order by Scheduled Delivery

In another implementation, the computer system can access a delivery schedule for the store and order waypoints for an upcoming scan cycle based on product scheduled for upcoming delivery. For example, the computer system can access a delivery schedule indicating that a carbonated beverage delivery vehicle is scheduled to make a delivery of carbonated beverages within one to two hours. The computer system can thus trigger the robotic system to execute a scan cycle in Block S110. In Block S102, the computer system can also serve an ordered set of waypoints to the robotic system, including: a first group of waypoints defined along a carbonated beverage aisle in the store; followed by a second group of discrete waypoints adjacent discrete carbonated beverage displays (e.g., refrigerators) arranged throughout the store; followed by waypoints for the remainder of the store. Upon conclusion of the first and second groups of waypoints, the computer system can generate a carbonated beverage restocking list for the carbonated beverage and discrete carbonated beverage displays throughout the store in Block S150 based on image data collected from the robotic system during the scan cycle thus executed by the robotic system; associates of the store (or a carbonated beverage representative delivering product to the store) can then access this carbonated beverage restocking list to restock these slots throughout the store immediately upon arrival of the delivery vehicle.

Alternatively, in preparation for a scheduled delivery of carbonated beverages, the computer system can append an ordered list of waypoints—generated as described above—with the first group of waypoints defined along a carbonated beverage aisle in the store followed by the second group of discrete waypoints adjacent discrete carbonated beverage displays arranged throughout the store. During the scan cycle, the computer system can generate and serve real-time prompts to restock high-value slots in Block S140, as described below, based on image data collected during the scan cycle. Upon conclusion of the scan cycle, the computer system can generate a carbonated beverage restocking list specific to slots assigned carbonated beverages in Block S150 based on images recorded at the end of the scan cycle such that the carbonated beverage restocking list is most current upon arrival of the carbonated beverage delivery vehicle.

5.6 Waypoint Order by Manual Selection

In yet another implementation, the computer system can: receive a selection of a region of interest within the store from a store manager, regional manager, or other associate of the store, such as through a manager portal; and then order waypoints for an upcoming scan cycle with waypoints in this region of interest preceding all other waypoints in the ordered set of waypoints for the store. The computer system can then implement methods and techniques described above to order these discrete groups of waypoints.

The computer system can thus store a set of waypoints for a store, wherein each waypoint designates capture of images of one or more shelves within the store, and define an order for the robotic system to navigate through this set of waypoints during a scan cycle. In preparation for an upcoming scan cycle, the computer system can then push definitions for these waypoints and an order for these waypoints to the robotic system, such as over a cellular network or through a computer network (e.g., the Internet), in Block S102. However, the computer system can maintain, update, and/or distribute waypoints including any other data or prompts in any other format to one or more robotic systems placed within a store at any other type, time, or frequency.

6. Dispatch Time

Block S110 of the method S100 recites dispatching a robotic system to image a set of shelving structures within the store during a scan cycle concurrent with a peak traffic period in the store. (Block S110 can similarly recite dispatching a robotic system to image a set of shelving structures within the retail space during a scan cycle concurrent with open store hours in the retail space.) Generally, in Block S110, the computer system can trigger the robotic system to initiate a scan cycle in which the robotic system navigates through a set of predefined waypoints within the store—such as according to an order defined by the computer system in Block S102—and executes an imaging routine to capture a set of images at each waypoint.

In one implementation, the computer system dispatches the robotic system to execute a scan cycle during peak customer hours at the store. In one example in which the store includes a grocery store, the computer system: dispatches the robotic system after 5:00 PM and before 7:30 PM on a weekday; and after noon and before 7:00 PM on a weekend, as these time windows may represent peak customer hours at the store. In this example, on a weekday, the computer system can: return real-time prompts to restock high-value slots (or slots assigned to high-value products) to associates of the store in Block S140 while the robotic system executes a scan cycle within the 5:00 PM to 7:30 PM time window; and return a global restocking list for all empty, low-stock, and/or incorrectly-stocked slots throughout the store in Block S150 prior to a 10:00 PM scheduled weekday restocking period at the store (e.g., at 9:45 PM).

In the foregoing implementation, the computer system can write a default dispatch time of 6:30 PM on weekdays to the robotic system in Block S110. In this example implementation, the computer system can also: prompt the robotic system to navigate to high-priority waypoints (e.g., waypoints adjacent products associated with product values above a threshold product value) in Block S102 and to capture a first group of images across this first set of high-priority waypoints; and automatically serve prompts to associates of the store to restock empty, low-stock, and/or incorrectly-stocked slots captured in images recorded at these waypoints in Block S140. Once the robotic system can traverse this first set of waypoints, the computer system can further prompt the robotic system to navigate to and capture a second group of images at remaining waypoints within the store before returning to this first set of high-priority waypoints to capture a third group of images prior to conclusion of the scan cycle. Upon conclusion of the scan cycle, the computer system can transform the second and third group of images into a global restocking list in Block S150.

Alternatively, the computer system can dispatch the robotic system to execute a scan cycle at 5:30 PM on weekdays and prompt the robotic system to circle the store continuously during this peak traffic period from 5:30 PM to 7:00 PM. For example, in Block S102, the computer system can command the robotic system to navigate to and capture images at waypoints at ratios of: 3:1 for waypoints associated with aggregate product values in a top tertile of aggregate product values; 2:1 for waypoints associated with aggregate product values in a center tertile; and 1:1 for waypoints associated with aggregate product values in a lower tertile. The computer system can thus command the robotic system to image higher-value slots (or higher-value waypoints, products) a greater number of times than lower-value slots (or lower-value waypoints, products). The computer system can then: transmit restocking prompts for all empty, low-stock, and incorrectly-stocked slots in an upper tertile of slot values to associates of the store in real time in the Block S140; transmit restocking prompts for empty slots in a middle tertile of slot values in real-time in the Block S140; and asynchronously insert restocking prompts for slots in a lower tertile of slot values into the global restocking list in the Block S150. The computer system can also confirm whether a restock prompt to restock a particular slot—served to an associate of the store in Block S140—has been handled by regularly commanding the robotic system to return to a particular waypoint in which the particular slot is in the robotic system's field of view. For example, once the computer system identifies a high-value slot as empty in images received from the robotic system, the computer system can command the robotic system to navigate to and capture images at the particular waypoint at a ratio of 4:1. Alternatively, the computer system can command the robotic system to return to the particular waypoint to image the particular slot once an associate of the store confirms that the particular slot was restocked, such as through a handheld device assigned to the associate; the computer system can then confirm whether the slot was restocked by detecting new units of product in the particular slot in images subsequently received from the robotic system.

In the foregoing implementation, the computer system can also implement predefined scan cycle schedules for holidays and/or other high-traffic periods at the store. For example, the computer system can: dispatch the robotic system once per evening on weekdays (e.g., at 6:00 PM Monday through Friday); twice per weekend day (e.g., at 1:00 PM and 4:00 PM on Saturdays and Sundays); three times per day on days preceding holidays (e.g., at 10:00 AM, 2:00 PM, and 6:00 PM); and four times per day on holidays (e.g., at 9:00 AM, noon, 3:00 PM, and 6:00 PM).

In another implementation, the computer system can interface with a POS system within the store to track rates of sales in the store and then dispatch the robotic system to execute a scan cycle in Block S110 in response to the rate of sales exceeding a threshold rate for a preset duration. For example, the computer system can trigger the robotic system to begin a scan cycle in Block S110 if the total sale dollar amount or total number of product units sold in a period of time—such as within one hour, within four hours, within twelve hours, or since a last scan cycle—exceeds a threshold amount (e.g., $50,000 or 20,000 units). In another example, the computer system can trigger the robotic system to begin a scan cycle in Block S110 if a threshold proportion (e.g., 60%) of on-floor stock of a high-value product is sold through the POS for a threshold number of high-value products (e.g., ten unique high-value SKUs) since a last scan cycle.

In a similar implementation, the computer system can interface with overhead cameras within the store and/or with motion sensors at entrances of the store to estimate a number of customers within the store over time and then trigger the robotic system to begin a scan cycle in Block S110 if a number of customers in the store exceeds a threshold number at any singular time or exceeds a threshold number for a minimum duration of time.

In another implementation, the computer system can prompt the robotic system to execute a scan cycle in response to an upcoming restocking period for the store or for a particular section of the store, as described above, in Block S110 and then serve an ordered list of waypoints for the entire store or for the particular section of the store to the robotic system in Block S102.

However, the computer system can implement any other dynamic triggers to prompt the robotic system to execute a scan cycle based on real-time sales and/or traffic in the store in order to automatically collect images of slots in the shelf for detection of empty, low-stock, and incorrectly-stocked slots at times most needed by the store and customers of the store alike. The computer system can also implement both a dynamic trigger and a preset scan cycle schedule to prompt the robotic system to execute a scan cycle in Block S110.

7. Robotic System Navigation

Upon receipt of a command to execute a scan cycle in Block S110, the robotic system can navigate to a position within a store proximal a location defined by a preset waypoint. Generally, during a scan cycle, the robotic system autonomously navigates to a position and orientation—within a threshold distance and angle of a location and target orientation—specified in a current waypoint in preparation to capture one or more images, as specified in the waypoint.

In one implementation, before initiating a new scan cycle, the robotic system can download—from the computer system—a set of waypoints, a preferred order for the waypoints, and a master map of the store defining the coordinate system of the store. Once the robotic system leaves its assigned charging station at the beginning of a scan cycle, the robotic system can repeatedly sample its integrated mapping sensors (e.g., a LIDAR sensor) and construct a new map of its environment based on data collected by the mapping sensors. By comparing the new map to the master map, the robotic system can track its location within the store throughout the scan cycle. Furthermore, to navigate to a next waypoint, the robotic system can confirm its achievement of the waypoint—within a threshold distance and angular offset—based on alignment between a region of the master map corresponding to the $(x,y,\partial)$ location and target orientation defined in the current waypoint and a current output of the mapping sensors, as described above.

Alternatively, the robotic system can execute a waypoint defining a GPS location and compass heading and can confirm achievement of the waypoint based on outputs of a GPS sensor and compass sensor within the robotic system. However, the robotic system can implement any other methods or techniques to navigate to a position and orientation within the store within a threshold distance and angular offset from a location and target orientation defined in a waypoint.

8. Photographic Image and Image Metadata

Block S120 of the method S100 recites receiving a set of images from the robotic system, wherein each image in the set of images was recorded by the robotic system during the scan cycle and corresponds to one waypoint in a set of waypoints defined along the set of shelving structures. Generally, in Block S120, the computer system can download digital photographic images (or "images")—recorded by the robotic system through cameras designated in a current waypoint occupied by the robotic system during a scan cycle—from the robotic system. In particular, once the robotic system has reached a position within a store within a threshold distance of an angular offset from the $(x,y,\partial)$ location and orientation specified in a waypoint, the robotic system can trigger select integrated optical sensors (e.g., RGB CMOS or CCD cameras) to capture images according to the camera addresses defined in the waypoint and then upload these images to the computer system, such as over a cellular connection or via a computer network (e.g., the Internet) substantially in real-time. Alternatively, the robotic system can store these images in local memory and upload groups of images to the computer system en bloc (e.g., as a block of images recorded along one shelving structure or along one aisle of the store).

Once the robotic system captures an image, the robotic system can write various metadata to the image, such as: an identifier ("ID") of the robotic system; a timestamp indicating a date and time the image was captured; an actual position of the robotic system at the time the image was captured (e.g., a GPS position and/or an $(x,y,\partial)$ location and target orientation determined from a comparison between the master map and outputs of the mapping sensors); and an address of the camera that captured the image. The robotic system can also write the corresponding waypoint in its entirety or an identifier (e.g., a UUID, a unique numerical label) of the corresponding waypoint to the image metadata. Alternatively, the robotic system can extract various data from the waypoint—such as the location, target orientation, and addresses of the aisle, shelving structure, shelving segment, shelves, and/or slots expected to be in the field of view of the particular camera that captured the image—and write these data to the image metadata. However, the robotic system can store any other data with an image captured during a scan cycle within a store.

The robotic system can then upload these images to the remote computer system for processing, as described below. For example, the robotic system can transmit an image to a local Internet-connected wireless router substantially in real-time once the image is captured and tagged with metadata, as shown in FIG. 2. In another example, the robotic system can transmit batches of images to the wireless router asynchronously during or upon completion of the scan cycle. Alternatively, the robotic system can execute all or select Blocks of the method S100 S100 described below to process images locally.

9. Obstruction Detection

During execution of a scan cycle, the robotic system can detect an object obstructing access to a next waypoint; and the computer system (or the robotic system, the computer system in cooperation with the robotic system) can modify the robotic system's path or modify an original order of remaining waypoints in order to avoid this object, as shown in FIG. 5. For example, the robotic system can: sample integrated distance sensors, proximity sensors, and optical cameras to collect information relating to the robotic system's immediate environment; and then implement objection recognition or pattern matching techniques to determine the relative location and type of an object in the robotic system's forward path, such as a human, a shopping cart, a freestanding display, a liquid spill, a solids spill, etc. (Alternatively, the robotic system can pass these data to the computer system for processing.) The robotic system (or the computer system) can then modify the robotic system's path or modify an order of remaining waypoints according to the relative position and type of object in the robotic system's forward path.

9.1 Obstruction Handling

In one implementation, if the robotic system (or the computer system) determines that a next waypoint along an aisle—currently occupied by the robotic system—is blocked by a shopping cart or by a shopper but that the aisle is still passable by the robotic system, the robotic system can pause execution of the scan cycle for a threshold period of time (e.g., one minute) while waiting for the cart or shopper to move. In this implementation, if the nest waypoint remains blocked after this threshold period of time, the robotic system (or the computer system) can mark—in memory—the next waypoint (or specific slots, shelves, shelf segments, or shelving structures associated with the next waypoint) as "deferred" due to obstruction and progress forward around the next waypoint to a subsequent waypoint.

In another implementation, if the robotic system (or the computer system) determines that a shelf section, shelves, or slots associated with a current waypoint is/are blocked by a freestanding product display, the robotic system (or the computer system) can mark—in memory—the waypoint as bypassed due to (partial) obstruction of its field of view and navigate to a next waypoint (e.g., by navigating around the freestanding product display) to resume the scan cycle. Furthermore, if an obscured slot at this current waypoint is associated with a slot value greater than a threshold slot value, the computer system can transmit—to an associate—a prompt to move the freestanding product display and then prompt the robotic system to return to this waypoint once the associate confirms that the freestanding product display has been moved, such as described below.

In another implementation, in response to the robotic system detecting an object obstructing access to a next waypoint in the remaining set of ordered waypoints, the computer system can: mark—in memory—this next waypoint as deferred; implement methods and techniques described above to calculate a revised waypoint order for this set of remaining waypoints to enable the robotic system to physically avoid the object; serve the revised waypoint order to the robotic system; and trigger the robotic system to return to the next waypoint at a later time during the scan cycle, as shown in FIG. 5, such as at the end of the scan cycle or between two and ten minutes later. For example, if the robotic system determines that the first aisle ahead is blocked and impassible, the computer system can reorder the remaining set of waypoints such that the robotic system: navigates from its current waypoint on one side of the first aisle adjacent a first shelving structure to a waypoint on the opposite side of the first aisle; captures images at waypoints along the opposite side of the first aisle while moving away from the obstruction; navigates down a second aisle nearby; returns to the first aisle from an opposite end, such as immediately or at least five minutes after the obstruction was first identified in the first aisle; and then captures images at waypoints between the opposite end of the first aisle and the obstruction.

9.2 Deferred Waypoints

In the foregoing implementations, the computer system can prompt the robotic system to return to waypoints marked as deferred, such as by reordering remaining waypoints for the current scan cycle and uploading this reordered set of waypoints to the robotic system, as shown in FIG. 5.

In one implementation, the computer system maintains a list of deferred waypoints. Upon conclusion of the original ordered set of waypoints, the computer system orders the list of deferred waypoints: greatest single product value of a product assigned to a slot in the field of view of the robotic system when occupying a waypoint; by greatest aggregate product value of products assigned to slots within the field of view of cameras integrated into the robotic system when occupying a waypoint; or by shortest total distance traversed by the robotic system from its location at the conclusion of the original ordered list of waypoints, through this list of deferred waypoints, to its dock; etc.

In another implementation, the computer system can dynamically reorder the remaining set of waypoints and deferred waypoints. For example, the computer system can apply a scale factor less than 1.0 to values of deferred waypoints (or values of products or slots in the field of view of the robotic system at deferred waypoints) and then implement methods and techniques described above to recalculate an order for these remaining and deferred waypoints based on reduced values of these waypoints (or corresponding products or slots). In this example, the computer system can apply scale factors based on a type of obstruction detected near a waypoint—such as "0.9" for a human, "0.7" for a cart, "0.4" for a liquid spill, and "0.1" for a freestanding product display—to these waypoint (or product or slot) values for deferred waypoints, thereby accounting for a probability that the obstruction will be corrected before a next attempt to navigate to a deferred waypoint.

In this implementation, the computer system can also set a minimum wait time to retest a deferred waypoint. For example, the computer system can implement a preset, static minimum return time of five minutes for the computer system to return to a deferred waypoint. Alternatively, the computer system can select a minimum deferred waypoint return time according to a type of obstruction detected near a deferred waypoint, such as: twenty minutes or until receipt of confirmation from an associate that a spill has been cleaned for a liquid spill; ten minutes or until receipt of confirmation from an associate that a spill has been cleaned for a solids spill; two minutes for human traffic; and four minutes for shopping carts. The computer system can also set a flag to not return to deferred waypoints blocked or obscured by freestanding product displays within a current scan cycle.

Similarly, the computer system can set a maximum allowable time to revisit a deferred waypoint. For example, the computer system can stitch images collected along one row of waypoints facing a single shelving structure into a composite image of the shelving structure and then process this composite image into a state of each slot in the shelving structure. To ensure that all regions of the composite image are reasonably current, the computer system can set a maximum deferment time of fifteen minutes. Thus, the computer system can prompt the robotic system to return to a deferred waypoint along a shelving structure within fifteen minutes of an initial attempt to navigate to this waypoint; if this waypoint is still blocked, the computer system can reinsert all waypoints along this shelving structure into the remaining set of waypoints such that the robotic system reattempts to navigate to and collect images at each waypoint along the shelving structure within the current scan cycle.

The computer system can then implement methods and techniques described above to serve the reordered set of waypoints to the robotic system, which the robotic system can then execute to return to deferred waypoints to complete the scan cycle. Furthermore, if the robotic system returns to a previously-deferred waypoint and again determines that the waypoint or associated slot, shelf, or shelving segment is blocked or obscured, the computer system can repeat the foregoing processes to defer the waypoint and reorder waypoints remaining in the current scan cycle. The computer system can also maintain a counter of a number of attempts to navigate to each deferred waypoint and can discard a particular deferred waypoint from the current scan cycle if a number of attempts to navigate to this particular deferred waypoint exceeds a threshold number of (e.g., three) attempts.

However, the computer system can implement any other methods or techniques to defer and reorder waypoints throughout the store responsive to obstructed aisles or obscured views of slots, shelves, or shelving segments. Alternatively, the robotic system can implement the foregoing methods and techniques locally.

10. Revisiting Waypoints

As described above, the computer system can define an order for waypoints in the store than includes visiting select waypoints multiple times in Block S102. The computer system can additionally or alternatively dynamically reinsert select waypoints into a current scan cycle executed by the robotic system in order to collect more current images of particularly high-value waypoints, slots, and/or products during peak traffic periods within the store.

In one implementation, the computer system can "reactivate" a particular waypoint if a threshold period of time has passed since the particular waypoint was last visited by the robotic system during the current scan cycle. In particular, the computer system can reactivate highest-priority waypoints, such as: waypoints associated with greatest aggregate product or slot values; or waypoints associated with single products or slots of greatest values. For example, the computer system can: reactivate a first set of waypoints associated with aggregate product values in the top $95^{th}$ percentile every 20 minutes; reactivate a second set of waypoints associated with aggregate product values in $90^{th}$ percentile tier every forty-five minutes during a scan cycle. In this example, the computer system can implement static aggregate product values for each waypoint. Alternatively, the computer system can recalculate a product value for each SKU in the store based on sales data recorded through the POS during the scan cycle or extracted from images collected by the robotic system during the same scan cycle. Yet alternatively, the computer system can recalculate a slot value for each slot in the store based on real-time sales data and based on a last stock state of the slot (e.g., a ratio of percentage of actual units stocked versus number of units defined in the planogram), recalculate values of waypoints throughout the store based on these new slot values, and then reinsert select waypoints into the current scan cycle accordingly.

Therefore, the computer system can feed sales data collected during the scan cycle forward into (near-) real-time reprioritization of products and/or slots and then trigger the robotic system to revisit select waypoints associated with products or slots currently exhibiting greatest measured demand and value to the store (e.g., in terms of revenue or profit opportunity for the store).

In another implementation, the computer system can confirm whether a restocking prompt for a particular slot was completed by an associate of the store by prompting the robotic system to return to a corresponding waypoint during the scan cycle. For example, during execution of the scan cycle by the robotic system, the computer system can serve a first prompt to restock a first slot to an associate in real-time in Block S140; reinsert a first corresponding waypoint physically adjacent the first slot into a revised ordered for remaining waypoints for the scan cycle; serve the revised order for remaining waypoints to the robotic system prior to completion of the scan cycle; and process images recorded by the computer system at the first waypoint, as described below, to confirm that the first slot was (properly) restocked. The computer system can then remove this first prompt from the global restocking list generated in Block S150 if the first slot is determined to be properly or sufficiently stocked.

11. Scan Cycle Termination

Finally, the computer system (or the robotic system) can terminate the current scan cycle once all waypoints have been visited or attempted at least once by the robotic system. Alternatively, the computer system can terminate the current scan cycle: after a threshold duration of time since a start of the scan cycle (e.g., two hours); once a charge state of a battery in the robotic system drops below a threshold level (e.g., 20% charge); once a preset time of day is reached (e.g., 9:45 PM, or just before a scheduled restocking period); or once a threshold amount of image data has been uploaded to the computer system (e.g., one gigabyte of image data) during the current scan cycle.

12. Image Processing

Block S130 of the method S100 recites identifying, in the set of images, a set of slots within the set of shelving structures; and Block S134 of the method S100 recites, for each slot in the set of slots, determining a number of units of a product, assigned to the slot in a planogram of the retail space, currently in the slot. Alternatively, Block S130 can recite identifying, in the set of images, a set of empty slots within the set of shelving structures; and the method S100 can further include Block S132, which recites identifying a product assigned to each empty slot in the set of empty slots based on product location assignments defined in a planogram of the store. Generally, in Blocks S130, S132, and S134, the computer system can process images recorded by the robotic system during the scan cycle substantially in real-time to identify slots that may be empty, contain low quantities of assigned product, contain a unit of incorrect (i.e., unassigned) product, or contain misoriented units of assigned product, as shown in FIGS. 2 and 3.

12.1 Template Image Selection

In one implementation, the computer system maintains a database of template images, wherein each template image in the template image database: is associated with an identifier of a product (e.g., a SKU); and includes a photographic or graphical (e.g., computer drafted) representation of all or a portion of the product or packaging of the product. Each template image in the template image database can also be tagged with a product description, supplier, supply period, graphics release date, secondary graphic, barcode, color palette, packaging profile (e.g., packaging shape and size), and/or other quantitative or qualitative product packaging feature or descriptor. Furthermore, each template image in the template image database can be tagged with a product packaging orientation. For example, for one product associated with a particular SKU and packaged in a six-sided box, the template image database can include: a first template image squarely showing the front (or "primary") face of the box and tagged accordingly; a second template image squarely showing the rear face of the box and tagged accordingly; a third template image squarely showing the right face of the box and tagged accordingly; a fourth template image squarely showing the left face of the box and tagged accordingly; a fifth template image squarely showing the top face of the box and tagged accordingly; and a sixth template image squarely showing the bottom face of the box and tagged accordingly. In this example, the template image database can further include: a seventh template image showing the box angled to evenly expose both the front face and right face of the box and tagged accordingly; an eighth template image showing the box angled to expose the front face, right face, and the top face of the box and tagged accordingly; etc. The template image database can also contain multiple template images representing various lighting conditions for packaging of a particular SKU. Similarly, the template image database can contain multiple template images of damaged packagings of a particular SKU, such as template images of a dented can or template images of a box with a torn corner. However, the template image database can include template images representing any other views of a product or product packaging and including (e.g., tagged with) any other relevant data.

In one implementation, the computer system reads a shelving structure ID stored in the image metadata (or stored in the waypoint linked to the image) and retrieves SKUs of products assigned to the shelving structure ID from a product position database (or planogram, slot index, product position spreadsheet etc.). The computer system then retrieves a set of template images—from the database of template images—showing sides of products assigned these SKU values. For example, a shelving structure within a store can be stocked with80 unique product facings. In this example, the computer system can: amass a list of 80 unique SKUs designated for stocking on this shelving structure based on the shelving structure ID stored in the image metadata and the product position database; and aggregate a set of 80 template images—from a database of millions of template images associated with millions of SKUs—for subsequent comparison to the image, wherein each selected template image in the set represents a primary face of a packaging (e.g., a front face of a box, bag, can, or bottle, etc.) for one SKU associated with the shelving structure ID. Similarly, for the set of 80 unique SKUs associated with the shelving structure ID stored in the image metadata, the computer system can aggregate 480 template images—from the database of millions of template images—for subsequent comparison to the image, wherein each template image represents one of six sides of a packaging for one SKU designated for the shelving structure, and wherein the set of 480 template images includes one template image of each side of a packaging of each of the 80 SKUs. Alternatively, the computer system can aggregate all available template images (or all prioritized or highest-ranking template images) for SKUs associated with the shelving structure ID in the product position database, such as: two template images (e.g., front and back template images, as available) for a bottled or canned product; four template images (e.g., front, back, left, and right template images, as available) for a bagged product; and six template images (e.g., front, back, left, right, top, and bottom template images, as available) for a boxed product.

In addition to the shelving structure ID, the computer system can also extract a shelving segment ID stored in the image metadata (or stored in the waypoint linked to the image) and select template images from the database of template images based on SKUs assigned to shelves within this shelving segment ID. In particular, the shelving segment ID stored in the image metadata (or in the corresponding waypoint) can define a shelving segment—including one or more shelves—within the field of view of the camera when the robotic system is in the location and orientation defined in the waypoint. The computer system can therefore pass the shelving segment ID into the product position database (or planogram, slot index, product position spreadsheet etc.) to retrieve a set of SKUs of products designated for placement on shelves in the corresponding shelving segment. The computer system can then aggregate a relatively small set of template images—from the template image database—associated with this set of SKUs associated with the shelving segment ID. For example, for a set of 20 SKUs designated for stocking on a shelving segment assigned a shelving segment ID stored in the image metadata, the computer system can aggregate 20 template images—from the database of millions of template images—for subsequent comparison to the image, wherein each template image represents a primary face of a packaging for one SKU designated for the shelving segment.

Furthermore, in addition to a shelving structure ID and a shelving segment ID, the computer system can also filter the database of template images based on a shelf ID of a shelf stored in the image metadata (or stored in the waypoint linked to the image). In particular, the computer system can pass the shelf ID into the product position database (or planogram, slot index, product position spreadsheet etc.) to retrieve a set of SKUs of products designated for placement on the corresponding shelf and then aggregate a set of template images—from the database of template images—associated with each SKU in this set of SKUs. For example, for a set of 5 SKUs designated for stocking on a shelf assigned a shelf ID stored in the image metadata, the computer system can aggregate a set of 30 template images for subsequent comparison to the image, wherein each template image represents one of six sides of a packaging for one SKU in the set of SKUs.

In the variation described below in which the computer system correlates a particular region of the image with a designated slot in the shelving structure, the computer system can further filter the database of template images down to a set of template images (e.g., 6 or fewer template images) representing a single SKU of a particular product designated for the particular slot, and the computer system can compare this set of template images with the corresponding region in the image to detect the presence of a unit of the particular product in the particular slot.

The computer system can therefore aggregate a set of template images—from the template image database—for comparison with the image based on: the position of the robotic system at the time the image was captured; an aisle, a shelving structure, a shelving segment, a shelf, and/or a slot proximal the position of the robot; and SKUs of products designated for stocking within this aisle or on this shelving structure, shelving segment, shelf, and/or slot. In particular, the computer system can aggregate a set of template images—for subsequent comparison to the image to identify the presence or status of products stocked on the shelving structure—corresponding: to a single product designated for a particular slot to multiple products designated for slots above, below, and/or beside the particular slot; to multiple products designated for a single shelf; to multiple products designated for a set of shelves in a single shelving segment; to multiple products designated for multiple shelving segments in a single shelving structure; or to multiple products designated for two opposing shelving structures; etc., as defined in a product position database, a planogram, a slot index, etc., the computer system can assemble this set of template images that includes images of various sides, lighting conditions, orientations, graphics release, etc. from product packaging of each product identified. However, the computer system can implement any other method or technique to link one or more SKUs to the image, and the computer system can populate a relatively small set of template images from a relatively large database of template images in any other way and according to any other parameter.

In the foregoing implementations, the computer system can collect a set of SKUs and a corresponding set of template images that conform to time constraints for the image. In particular, the computer system can: extract a date and time of the image from the image timestamp; select a product position database, planogram, etc. current on the date and at the time of the image timestamp, as shown in FIG. 2; and aggregate a list of SKUs for the image from this current product position database, current planogram, etc. For example, products in the store may be rearranged or removed and new products may be added to the store in preparation for an upcoming holiday, in anticipation of seasonal changes, etc., such as on a daily, weekly, monthly, quarterly, or annual basis, and these changes may be defined across a set of planograms for the store. The computer system can therefore collect SKUs designated for a particular slot, shelf, shelf segment, shelving structure, or aisle, etc. from a current planogram (or from a current product position database containing data from the current planogram) in order to accommodate such daily, weekly, monthly, quarterly, or annual shifts in SKUs assigned to slots in the store.

Similarly, the computer system can select template images current to the image timestamp. For example, for each SKU identified, the computer system can aggregate a set of template images of the newest product packaging associated with the SKU and template images of a previous product packaging associated with the SKU. The computer system can then compare these current-revision template images and previous-revision template images to the image to identify a unit of the corresponding product in the image even if the unit is out of date.

The computer system can implement similar methods and techniques to collect graphics, text, barcodes, color palettes, packaging profiles (e.g., shapes), and/or other quantitative or qualitative product packaging features for SKUs thus associated with the image—from a database of quantitative or qualitative product packaging features of a large population of SKUs—in preparation to identify and characterize products arranged on a shelving structure shown in the image.

12.2 Slot Detection

In one variation, the computer system: maps a particular region of the image to a particular slot within a particular shelving structure; identifies a particular SKU assigned to the particular slot from a product position database (e.g., from a corresponding planogram or slot index); selects a set of template images corresponding to the particular SKU; and designates this set of template images for comparison to the particular region in the image.

In one implementation, the computer system identifies a region in the image corresponding to a slot by automatically delineating regions in the image according to slot dimensions for the shelf, such as stored in the slot index. In this implementation, the computer system can: retrieve a shelf address—for a shelf in the field of view of the camera that captured the image—directly from the image metadata (or from the waypoint linked to the image); retrieve slot dimensions (e.g., slot widths) and slot positions for slots on the particular shelf by passing the shelf address through a slot index (e.g., a spreadsheet or other database); and map slot dimensions and slot positions for the shelf to the image. For example, the computer system can anticipate the vertical position of the particular shelf in the image based on the address of the particular camera, which is linked to the vertical position of the particular camera on the robotic system, and based on the address of the particular shelf, which is linked to a vertical position of the particular shelf in a particular shelving segment of known location within a particular shelving structure in the store. In this example, the computer system can then implement computer vision techniques (e.g., edge detection) to detect the full span of the particular shelf (e.g., a four-foot-long shelf) in the image based on the anticipated vertical position of the particular shelf in the image, map a string of slot widths—defined in the slot index—to the region of the image corresponding to the particular shelf, and thus delineate regions in the image above the particular shelf as distinct slots according to the string of slot widths. The computer system can thus delineate "slot regions" (e.g., a row of rectangular slot regions) in the image corresponding to slots predefined for a known shelf shown in the image. Furthermore, the slot index (or product position database) can associate each slot address with a SKU, and the computer system can thus map a SKU value in the slot index to a region in the image thus mapped to the corresponding slot address.

In a similar implementation, the computer system can identify a region in the image corresponding to a slot on a shelf shown in the image by mapping a section of a planogram directly to the image and delineating regions of the image according to product facings shown in the planogram. In this implementation, the computer system can: retrieve a shelving structure address and a shelving section address from the image metadata (or from the corresponding waypoint); retrieve a planogram for the shelving structure address; select a region of the planogram corresponding to the shelving segment address in the field recorded in the image; and then implement computer vision techniques to skew, scale, translate, and/or rotate the selected region of the planogram into alignment with the field shown in the image, such as by detecting edges in images corresponding to faces of shelves and aligning shelf edges in the planogram to shelf edges detected in the image. The computer system can then segment the image into one slot region for each facing shown in the selected region of the planogram and assign SKUs segments in the image based on SKUs stored in corresponding regions of the planogram.

In another implementation, the computer system delineates regions in the image corresponding to slots according to features shown in the image (e.g., without the aid of a product position database, planogram, or slot index, etc.). In one example, the computer system: implements edge detection techniques to distinguish different surfaces in the image; implements template matching, color matching, or other computer vision techniques to identify shelf surfaces (e.g., shelf faces, tops of shelves, undersides of shelves, shelf backings, lighting, etc.) in the image; and designates remaining surfaces in the image as slot regions for subsequent analysis. In another example, the computer system: implements computer vision techniques to detect a (paper or electronic) product label on a shelf within the image; and designates a region in the image above (or below) the product label as a slot region for subsequent analysis. In this and the foregoing implementations, the computer system can then compare each slot region thus identified or estimated in the image with template images selected for the image in order to identify a product and its status on a shelf shown in the image.

In one variation, the computer system: implements computer vision techniques to detect a product label on a shelf within the image; reads a barcode, QR code, SKU, product description, and/or other product identifier; selects a set of template images tagged with the same barcode, QR code, SKU, product description, facing count, and/or other product identifier; and assigns the set of template images to a slot region in the image proximal (e.g., above) the product label. In this variation, the computer system can then determine the status of a product arranged on the shelf in the corresponding slot based directly on product facing count and product identifier data appearing on a product label applied to a shelf. Alternatively, the computer system can retrieve stocking requirements for the slot by passing the product identifier read from the product label into a product position database and compare these stocking requirements to data tagged to a template image matched to the slot region in the image to determine the stocking status of the slot, as described below.

However, the computer system can implement any other methods and techniques to select a relatively small set of template images—from a relatively large set of template images—for comparison to one or more regions (or "slot regions") in the image.

12.3 Product Identification

In one implementation, the computer system implements computer vision techniques to scan each template image—in the set of template images selected for the image—across the image and to match select template images to regions in the image, as shown in FIG. 2. For example, the computer system can implement template matching techniques to identify a region in the image that visually matches a particular template image within a threshold confidence interval (and that better matches the particular template image than other templates images in the set). The computer system can then tag this region of the image with a SKU associated with the particular template image. For the particular template image that is tagged with additional data, such as packaging side, packaging orientation, product description, supplier, supply period, graphics release date, packaging damage, etc., the computer system can also copy these data into tags for the region of the image matched to the particular template image. The computer system can repeat this process to match template images in the set to other regions in the image and to tag other regions in the image with data from matched template images.

In this implementation, the computer system can implement template matching, edge detection, pattern matching, pattern recognition, optical character recognition, color recognition, content-based image retrieval, pose estimation, code reading, shape recognition, and/or any other suitable method or technique to detect an object—corresponding to a unit of a product—in the image and to match this object to a labeled template object shown in a template image.

The computer system can also aggregate SKUs and other product data thus linked to regions in the image into a 2D map (or an image overlay, a spreadsheet, etc.) of products stocked on shelves shown in the image. For example, the computer system can transform regions in the image matched to template images into a 2D map of slots on shelves shown in the image, wherein each slot is labeled with a SKU, a packaging side, a packaging orientation, and/or other data extracted from a template image matched to the corresponding region in the image. Alternatively, in the variation described above in which the computer system delineates slot regions in the image based on a slot index (or product position database, etc.) prior to comparing the image to template images, the computer system can generate a 2D map of slot containers for each slot shown in the image based on a slot index (or product position database) and slot, shelf, shelving segment, and/or shelving structure IDs stored in the image metadata; when a region in the image is matched to a template image in Block 150 or Block S160, the computer system can then copy product data from the template image into the corresponding slot container in the 2D map. However, the computer system can store product data from template images matched to regions in the image in any other format.

12.4 Product Status

The computer system can then determine whether products identified in the image fulfill stocking requirements defined in a current planogram, as shown in FIG. 2. For example, the computer system can determine: if a product facing is present; if the primary side of a product packaging is facing outwardly on a shelf; if the product packaging is upright; if the product packaging is set at the right depth on the shelf; if the product packaging is damaged; if the correct number of facings of a product are showing; if product packagings are current; etc. based on regions in the image tagged with product data, a 2D map of a set of shelves generated in Blocks S150 or S160, and/or product position requirements defined in a product position database or planogram.

In one implementation, the computer system compares the 2D map generated directly to a product position database to detect deviations of real product stocking from stocking specification defined in the product position database. Alternatively, the computer system can: estimate a slot region for each product identified in the image; extract an approximate width, height, and position of each slot region identified in the image; match slots defined in the product position database (or planogram, slot index, etc.) to slot regions identified in the image; and then compare product data tagged to each identified slot region in the image to stocking requirements written to corresponding slots in the product position database to detect deviations from these stocking requirements.

For example, in Block S120, the computer system can: receive a first subset of images recorded by the robotic system occupying waypoints along a first shelving structure over a first period of time; and receive a second subset of images recorded by the robotic system occupying waypoints along a second shelving structure over a second period of time succeeding the first period of time. In this example, the computer system can then: stitch the first subset of images into a first composite image of the first shelving structure; project a first set of slot boundaries defined in the planogram for the first shelving structure onto the first composite image; stitch the second subset of images into a second composite image of the second shelving structure; and project a second set of slot boundaries defined in the planogram for the second shelving structure onto the second composite image in Block S130. Furthermore, the computer system can: identify a first set of empty slots in the first composite image bounded by the first set of slot boundaries and excluding visual representation of a product assigned to a corresponding slot defined in the planogram; identify a second set of empty slots in the second composite image bounded by the second set of slot boundaries and excluding visual representation of a product assigned to a corresponding slot defined in the planogram; and label each empty slot in the first set of empty slots and the second set of empty slots as empty in Block S132. In this example, the computer system can also label a third slot within one of the shelving structures as improperly-stocked based on a difference between: a product identified in a region of an image—in the first set of images—corresponding to the third slot; and a third product assigned to the third slot in the planogram. The computer system can then selectively serve prompts to correct both the first and second sets of empty slots and the third improperly-stocked slot in Blocks S140 and S150 described below.

However, the computer system can implement any other method or technique to identify real deviations from stocking requirements defined in a product position database, planogram, or slot index, etc. for the store.

13. Real-Time Restock Prompts

Block S140 of the method S100 recites, for a first slot in the set of slots associated with a first slot value, generating a first prompt to restock the first slot with a unit of a first product during the scan cycle. Block S140 can similarly recite, for a first product associated with a first product value and assigned to a first empty slot in the set of empty slots, generating a first prompt to restock the first empty slot with a unit of the first product during the scan cycle. Generally, in Block S140, the computer system can respond to select slots—identified as empty, containing low-stock, containing units of unassigned products, or containing misoriented units of product and assigned high-value products or associated with high slot values—by serving prompts to correct these slots to associates of the store substantially in real-time.

13.1 Prompts Based on Product Value

In one implementation, the computer system executes Blocks S130, S132, and/or S134 substantially in real-time as images are received from the robotic system, generates prompts to correct empty slots, and serves a notification to an associate of the store to restock select slots substantially in real-time for select slots assigned products—in the planogram—that exceeds a threshold product value in Block S140. For example, for a first slot assigned a first product associated with a first product value that exceeds a preset, static threshold product value, the computer system can generate a first prompt to restock the first empty slot with a number of units of the first product—specified for the slot in the planogram—in substantially real-time during the scan cycle.

In a similar implementation, the computer system can receive batches of images from the computer system in Block S120 and/or process images in batches in Blocks S130, S132, and S134, such as by processing batches of images corresponding to one shelving structure or one aisle at a time. For example, the computer system can: implement methods and techniques described above to identify empty slots within one aisle represented in a batch of images; identify a subset of empty slots along the aisle assigned to products associated with product values exceeding a threshold value; and then serve prompts to restock empty slots in the subset of empty slots by associated product value. In this example, the computer system can sequentially serve one notification to restock one empty slot in this subset of empty slots in the aisle at a time to an associate assigned to the aisle in real-time in Block S140, such as including pushing a next restock prompt to a handheld device assigned to the associates in real-time in response to receipt of confirmation—entered through the associate's handheld device—that a last restocking prompt was completed.

Alternatively, the computer system can serve notifications to restock multiple or all empty slots in this subset of empty slots in the aisle at a time to the associate in real-time in Block S140, thereby prompting the associate to immediately handle multiple empty slots in a single trip to the aisle. Therefore, the computer system can batch restocking prompts for nearby slots in the store, such as for slots in adjacent shelving structures or in adjacent aisles.

The computer system can implement similar methods and techniques to batch processing and real-time notification generation for a group of images recorded across any other set of waypoints, such as a first group of highest-priority waypoints or a group of waypoints in a first section of multiple aisles within the store executed by the robotic system. The computer system can also implement methods and techniques described above to calculate current product values for products assigned to slots within the store before prioritizing or ranking empty slots identified in images received from the robotic system.

13.2 Prompts Based on Slot Value

Alternatively, the computer system can: calculate a slot value for each slot identified in images received from the robotic system; and selectively serve prompts to correct slots based on corresponding slot values. For example, the computer system can fuse availability of a product assigned to a particular slot, an amount of time the particular slot has been empty (an "out-of-stock time"), a popularity of the product (e.g., a sale rate of the product), and profitability (e.g., a margin) of the product into a slot value of the particular slot. In this example, the computer system can calculate an availability of the product as a function of a number of units of a product currently housed in the particular slot—as determined from a recent image of the particular slot—and a number of units of the product assigned to the particular slot in the planogram; that is:

[availability]=[#detected units]/[#units specified in planogram].

In this example, the computer system can also calculate an out-of-stock time for the particular slot, such as including a duration of time that the slot has been empty of assigned product relative to a maximum threshold duration, that is:

[out-of-stock time]=[duration of empty slot]/[maximum threshold duration].

Furthermore, the computer system can calculate a popularity of the particular slot, such as including a sale rate of the product through a POS in the store or a change rate of product detected in the particular slot over a previous series of scan cycles. Similarly, the computer system can access a preset profitability of the product assigned to the particular slot, that is:

[profitability]=1−[wholesale price]/[current retail price], such as including current retail list price or current sale price entered by a regional manager and stored in a remote pricing database. Alternatively, the computer system can extract pricing data directly from a region of an image of the particular slot corresponding to a pricing card for the particular slot, such as by implementing optical character recognition to read a price value and a SKU value from the pricing card and confirming that the pricing card corresponds to the particular slot by matching the SKU value extracted from the image to a SKU value assigned to the particular slot in the planogram.

The computer system can then compile availability, out-of-stock time, popularity, and profitability into a slot value for the particular slot in Block S136. For example, the computer system can: host a manager portal; receive weights (e.g., between 0.0 and 1.0) for each of availability, out-of-stock time, popularity, and profitability from a manager of the store through the manager portal; and then compile availability, out-of-stock time, popularity, and profitability for the particular slot into a slot value according to these weights. In this example, the manager portal can include a set of sliders that the manager can slide along a spectrum between a "0.0" position and a "1.0" to set weights for each of these variables, as shown in FIG. 1. The computer system can then implement an algorithm including:

[slot value]=[availability weight]·[availability]+[out-of-stock weight]·[out-of-stock time]+[popularity weight]·[popularity]+[profitability weight]·[profitability]

to calculate a slot value for the particular slot, as shown in FIG. 1, in Block S136. The computer system can repeat this process for each other slot in the store based on data collected during the scan cycle—such as in real-time as singular images, as batches of images from one waypoint, or as batches of images from multiple waypoints (e.g., along a single shelving structure)—are received from the robotic system.

The computer system can then implement methods and techniques similar to those described above to generate restocking prompts for select slots associated with slot values exceeding a preset threshold slot value or occurring in an upper percentile of slot values in the store in real-time in Block S140. For example, the computer system can set a minimum threshold slot value to trigger real-time generation and delivery of a restocking prompt for a shelf as the slot value dividing the third quartile (e.g., 50% to 75% of maximum) from the fourth quartile (75% to 100% of maximum) of slot values calculated from data recorded during a last scan cycle of the store in preparation to issue real-time restocking notifications for slots associated with the top quartile of slot values in the store during the current scan cycle. (The computer system can implement similar methods and techniques to calculate a minimum threshold product value to trigger real-time generating and distribution of product value-based restocking prompts, as described above.)

Therefore, the computer system can sequentially serve a mix of restocking prompts for empty, low-stock, incorrectly-stocked, and misoriented slots based on slot values for each of these slots, as shown in FIG. 3. For example, the computer system can: first serve a restocking prompt to refill a first slot assigned a high-margin, high-sale-rate product and currently containing two of six units of the product specified in the planogram; then serve a restocking prompt to refill a second, empty slot assigned a high-margin, moderate-sale-rate product; and then serve a slot correction prompt to reorient product in a third slot assigned a high-margin, high-sale-rate product and currently containing 80% or more of its assigned number of units but with at least one of these units misoriented (e.g., facing backward) in the slot; etc. Alternatively, for the first, second, and third slots that are within close proximity (e.g., in the same section of the store, in the same aisle, or on the same shelving structure), the computer system can batch the restocking and slot correction prompts into a composite notification and then send this composite notification directly to an associate's handheld device or to an external associate management platform for distribution to a computing device assigned to an associate within the store.

13.3 Prompt Components and Distribution

Furthermore, in the foregoing implementations, when generating a restocking (or slot correction) prompt for a particular slot, the computer system can insert: a SKU of a particular product assigned to the particular slot; a total number of units of the particular product specified for stocking in the particular slot; a number of units of the particular product currently occupying the particular slot; a target number of units of the particular product to load into the particular slot; and/or a location of the particular slot in the store, such as in the form of a location on a map or slot address (e.g., aisle number, shelving structure number, shelving segment number, shelf number, and slot number); etc. into the restocking prompt. Upon receipt of this restocking prompt, an associate can retrieve the target number of units of the particular slot according to the specified SKU and tow these units to the location of the particular slot for restocking.

The computer system can then transmit a restocking prompt to select associates, such as by matching a restocking prompt to a particular associate assigned to manage a region of the store containing the corresponding slot and then transmitting the restocking prompt to a handheld device assigned to this associate. Alternatively, the computer system can transmit the restocking prompt to an external associate management platform for external distribution to one or more associates of the store.

14. Global Restocking List

As shown in FIGS. 1 and 3, Block S150 of the method S100 recites, in response to completion of the scan cycle, generating a global restocking list specifying restocking of a second subset of slots in the set of slots, wherein each slot in the second subset of slots associated with a slot value less than the first slot value. Generally, in Block S150, the computer system generates a global restocking list containing prompts to restock empty slots, restock low-stock slots, correct misplaced product in slots, and/or to correct misoriented stock in slots throughout the entire store based on slot status determined from images captured by the robotic system during the preceding scan cycle. In particular, the computer system can generate a master "punch list" for restocking slots throughout the store; associates of the store can then restock the store during a next restocking shift (e.g., during low-traffic hours or closed hours) according to this master punch list.

In one implementation, the computer system: aggregates all restocking (and slot correction) prompts generated in response to deviations from a planogram for the store, including prompts served to associates of the store in real-time during the scan cycle; writes data from prompts to a global restocking list; and then serves this global restocking list to a manager of the store through a manager portal hosted by the computer system in Block S150. In this implementation, before serving the global restocking list to the store manager, the computer system can also filter out (i.e., remove)—from the global restocking list—restocking prompts confirmed as completed by associates or automatically confirmed as restocked by the computer system based on images collected by the robotic system upon revisiting corresponding waypoints, as described above.

The computer system can additionally or alternatively serve portions of the global restocking list across a set of computing devices affiliated with associates of the store following completion of the scan cycle and/or in preparation for an upcoming scheduled restocking period. For example, the computer system can segregate prompts from the global restocking list into associate-specific restocking lists, such as based on regions of the store, aisles, shelving structures, or specific slots assigned to each associate currently on duty in the store; the computer system can then serve these associate-specific restocking lists directly to handheld devices assigned to these associates.

In the foregoing implementation, the computer system can also order restocking (and slot correction) prompts represented in the global restocking list by a product value and/or a slot value associated with each prompt. Associates of the store can then address prompts in the global restocking list in order, thereby restocking and correcting highest-value slots first and ending with lowest-value slots. Furthermore, for slots stocked by third-party (i.e., external) suppliers (e.g., carbonated beverages), the computer system can serve select restocking prompts from the global restocking list to accounts or portals associated with these third-party suppliers, thereby both prompting these third-party suppliers to return to the store to restock their slots in the store and specifying specific SKUs and corresponding unit quantities to bring to the store during a next delivery or next restocking visit to the store.

The computer system can also: cross-reference prompts in the global restocking list with back stock in the store to filter out prompts for which no or insufficient inventory exists to restock an empty or low-stock shelf; and automatically interface with an external ordering portal, with a store manager, or with a regional manager to automatically submit an order for additional units of product.

Similarly, the computer system can: access a list of products expected in an upcoming delivery; compare this list of products to the global restocking list; and then generate a delivery schedule specifying which products, boxes, or pallets, etc. received in the upcoming delivery may be immediately set aside for reloading into slots in the store. When unloading a truck during such delivery, associates of the store can selectively distribute products unloaded from the truck to back stock and to floor stock based on this delivery schedule.

15. Restocking Check

In one variation, the computer system can further: dispatch the robotic system to image the set of shelving structures during a second scan cycle at a time succeeding the first scan cycle (e.g., following distribution of the global restocking list to an associate of the store or following a manual restocking period in the store); receive a second set of images from the robotic system, wherein each image in the set of images was recorded by the robotic system during the second scan cycle and corresponds to one waypoint in the set of waypoints; identify, in the second set of images, a set of slots on shelves within the set of shelving structures; labeling—in memory—each slot in the set of slots as one of stocked, under-stocked, empty, and improperly-stocked based on a comparison between visual data in each slot identified in the second set of images and the planogram of the store; and then generate a list of deviations between the global restocking list and a state of the store during the second scan cycle based on labels assigned to each slot in the set of slots. Generally, in this variation, the computer system can trigger the robotic system to execute a second scan cycle once the store has been restocked according to the global restocking list generated in Block S150 in order to confirm execution of the global restocking list. In particular, the computer system can implement methods and techniques described above to collect images from the robotic system following execution of the second scan cycle and to transform these images into a stock state of each slot (or a subset of slots) in the store. The computer system can then compare these stock states to the global restocking list to identify slots not properly restocked during the restocking period; the computer system can then issue restocking prompts in real-time during the second scan cycle and/or issue a second global restocking list following conclusion of the second scan cycle in order to correct any outstanding slot defects in the store.

In this variation, the computer system can also generate an ordered list of waypoints—for execution by the robotic system during the second scan cycle—that includes waypoints associated with slots referenced in the global restocking list generated in Block S150 exclusively, thereby limiting the duration and total number of images recorded during the second scan cycle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   dispatching a robotic system to autonomously navigate along a path within a store during a first scan cycle;
   accessing a set of images:
     recorded by the robotic system during the first scan cycle; and
     depicting a set of inventory structures in the store;
   in a first image, in the set of images, detecting a first slot and a second slot in a first inventory structure, the first slot assigned a first product type, and the second slot assigned a second product type;
   based on the first image, detecting a first stock condition of the first slot and a second stock condition of the second slot;
   accessing a first slot value of the first slot and a second slot value of the second slot; and
   in response to the first slot value exceeding the second slot value:
     based on the first stock condition, generating a first prompt to restock the first slot in the first inventory structure with the first product type;
     transmitting the first prompt to a computing device affiliated with an associate of the store during the first scan cycle; and
     withholding transmission of a second prompt to restock the second slot.

2. The method of claim 1:
   wherein accessing the first slot value of the first slot and the second slot value of the second slot comprises:
     calculating a first slot value of the first slot as a function of a first product value of the first product type assigned to the first slot; and
     calculating a second slot value of the second slot as a function of a second product value of the second product type assigned to the second slot; and
   wherein detecting the first stock condition in the first slot and the second stock condition in the second slot comprises:
     detecting a first understock condition in the first slot by:
       identifying a first quantity of units, of the first product type, depicted in a first region of the first image corresponding to the first slot; and
       in response to the first quantity of units falling below a first target quantity of units assigned to the first slot, detecting the first understock condition in the first slot at a first time corresponding to recordation of the first image by the robotic system during the first scan cycle; and detecting a second understock condition in the second slot by:
identifying a second quantity of units, of the second product type, depicted in a second region of the first image corresponding to the second slot; and
in response to the second quantity falling below a second target quantity of units assigned to the second slot, detecting the second understock condition in the second slot at a first time corresponding to recordation of the first image by the robotic system during the first scan cycle.

3. The method of claim 2:
wherein identifying the first quantity of units, of the first product type, depicted in the first region of the first image corresponding to the first slot comprises identifying a first quantity of product facings of the first product type in the first region of the first image;
wherein identifying the second quantity of units, of the second product type, depicted in the second region of the first image comprises identifying a second quantity of product facings of the second product type in the second region of the first image;
wherein detecting the first understock condition in the first slot comprises detecting the first understock condition in the first slot in response to the first quantity falling below a target quantity of product facings of the first product type assigned to the first slot; and
wherein detecting the second understock condition in the second slot comprises detecting the second understock condition in the second slot in response to the second quantity falling below a target quantity of product facings of the second product type assigned to the second slot.

4. The method of claim 1, wherein accessing the first slot value of the first slot and the second slot value of the second slot comprises:
calculating the first slot value of the first slot as a function of a first profit margin and a first sell-through rate of the first product type assigned to the first slot; and
calculating the second slot value of the second slot as a function of a second profit margin and a second sell-through rate of the second product type assigned to the second slot.

5. The method of claim 1:
wherein detecting the first stock condition in the first slot and the second stock condition in the second slot comprises:
detecting a first orientation of a first product unit, of the first product type, in a first region of the first image corresponding to the first slot;
in response to the first orientation falling outside a first target orientation range assigned to the first product type, detecting a first misalignment in the first slot at a first time corresponding to recordation of the first image by the robotic system during the first scan cycle;
detecting a second orientation of a second product unit, of the second product type, in a second region of the first image corresponding to the second slot; and
in response to the second orientation falling outside a second target orientation range assigned to the second product type, detecting a second misalignment in the second slot at the first time corresponding to recordation of the first image by the robotic system during the first scan cycle; and
wherein accessing the first slot value of the first slot and the second slot value of the second slot comprises:
calculating the first slot value based on the first misalignment; and
calculating the second slot value based on the second misalignment.

6. The method of claim 1:
wherein detecting the first stock condition in the first slot and the second stock condition in the second slot comprises:
detecting a first product unit in a first region of the first image corresponding to the first slot;
identifying the first product unit as a third product type, not assigned to the first slot, based on features detected in the first region of the first image;
flagging the first product unit for removal from the first slot;
detecting a second set of product units in a second region of the first image corresponding to the second slot; and
identifying each product unit, in the second set of product units, as the second product type, assigned to the second slot, based on features detected in the second region of the first image; and
wherein generating the first prompt to restock the first slot in the first inventory structure with the first product type comprises, in response to flagging the first product unit for removal from the first slot, generating the first prompt to replace the first product unit with products of the first product type in the first slot in the first inventory structure.

7. The method of claim 1:
wherein transmitting the first prompt to the computing device affiliated with the associate of the store during the first scan cycle comprises: transmitting the first prompt to restock the first slot in the first inventory structure with the first product type to the computing device based on the first slot value exceeding a threshold value; and
further comprising:
in a second image, in the set of images, detecting a third slot and a fourth slot in a second inventory structure, the third slot assigned a third product type, and the fourth slot assigned a fourth product type;
based on the second image, detecting a third stock condition of the third slot and a fourth stock condition of the fourth slot;
accessing a third slot value of the third slot and a fourth slot value of the fourth slot; and
in response to the second slot value, third slot value, and fourth slot value falling below the threshold value:
accessing a global restocking list specifying restocking of slots in the store;
appending the second slot, the third slot, and the fourth slot to the global restocking list;
generating a second prompt to restock the slots included in the global restocking list; and
transmitting the second prompt to the computing device affiliated with the associate of the store after completion of the first scan cycle.

8. The method of claim 1:
further comprising, for each inventory structure within the set of inventory structures:

calculating a slot value sum of the inventory structure based on a combination of slot values of a population of slots in the inventory structure; and calculating a scan frequency for the inventory structure during the first scan cycle based on the slot value sum of the inventory structure; and wherein dispatching the robotic system to autonomously navigate along the set of inventory structures during the first scan cycle comprises dispatching the robotic system to capture images of the set of inventory structures according to scan frequencies of inventory structures in the set of inventory structures during the first scan cycle.

9. The method of claim 1:

further comprising:

detecting a third stock condition of the first slot, derived from a second set of images captured by the robotic system during a second scan cycle preceding the first scan cycle;

detecting a fourth stock condition of the second slot, derived from the second set of images captured by the robotic system during the second scan cycle;

calculating a first understock duration of the first slot based on the first stock condition, the third stock condition, and a duration of time between the second scan cycle and the first scan cycle; and calculating a second understock duration of the second slot based on the second stock condition, the fourth stock condition, and the duration of time between the second scan cycle and the first scan cycle; and wherein accessing the first slot value of the first slot, and the second slot value of the second slot comprises, in response to the first understock duration exceeding the second understock duration:

calculating the first slot value proportional to the first understock duration; and calculating the second slot value, less than the first slot value, proportional to the second out-of-stock duration, shorter than the first understock duration.

10. The method of claim 1:

wherein accessing the first slot value of the first slot comprises calculating the first slot value based on a first sale rate of the first product type assigned to the first slot, and the first stock condition of the first slot;

wherein accessing the second slot value of the second slot comprises calculating the second slot value based on a second sale rate of the second product type assigned to the second slot, and the second stock condition of the second slot; and further comprising:

detecting a third slot depicted in the first image, the third slot assigned a third product type;

based on the first image, detecting a third stock condition of the third slot indicating the third slot is empty;

calculating a third slot value of the third slot based on a third sale rate of the third product type and the third stock condition; and in response to the third slot value falling below the first slot value:

accessing a global restocking list specifying restocking of slots in the store; and appending the third slot to the global restocking list.

11. The method of claim 1, further comprising:

detecting a third slot in the inventory structure depicted in the first image, the third slot assigned a third product type;

detecting a third stock condition in the third slot; and in response to detecting the third stock condition and in response to the third product type designated for stocking by a third-party supplier:

generating a supplier restocking list specifying restocking of the third slot; and distributing the supplier restocking list to a portal affiliated with the third-party supplier.

12. The method of claim 11, wherein distributing the supplier restocking list to the portal affiliated with the third-party supplier comprises distributing the supplier restocking list to the portal following conclusion of the first scan cycle and prior to a next scheduled delivery to the store by the third-party supplier.

* * * * *